(12) United States Patent
Hart et al.

(10) Patent No.: US 7,963,590 B2
(45) Date of Patent: Jun. 21, 2011

(54) ASSEMBLY FOR VEHICLES INCLUDING ADJUSTABLE MIRRORS

(75) Inventors: Robert Lee Hart, Cincinnati, OH (US); Karen Ellerson Schmahl, Fairfield, OH (US)

(73) Assignee: IFM Limited, LLC, Cincinnati, OH (US)

( * ) Notice: Subject to any disclaimer, the term of this patent is extended or adjusted under 35 U.S.C. 154(b) by 368 days.

(21) Appl. No.: 11/805,206

(22) Filed: May 22, 2007

(65) Prior Publication Data

US 2007/0267900 A1    Nov. 22, 2007

Related U.S. Application Data

(60) Provisional application No. 60/802,299, filed on May 22, 2006.

(51) Int. Cl.
*B62D 25/08* (2006.01)
(52) U.S. Cl. .................................................. 296/193.09
(58) Field of Classification Search ............. 296/193.09, 296/203.01
See application file for complete search history.

(56) References Cited

U.S. PATENT DOCUMENTS

| | | | |
|---|---|---|---|
| 1,980,149 A | * | 11/1934 | Zink ............................ 248/480 |
| 1,988,016 A | * | 1/1935 | Nisbet ........................ 296/96.11 |
| 2,122,445 A | * | 7/1938 | Tjaarda ....................... 296/203.01 |
| 2,134,016 A | * | 10/1938 | Zink ............................ 248/484 |
| 2,210,533 A | * | 8/1940 | Fisher et al. .............. 296/203.01 |
| 2,389,907 A | * | 11/1945 | Helmuth ................... 296/203.01 |
| 2,447,786 A | * | 8/1948 | Anderson, Jr. ................ 248/476 |
| 2,533,867 A | * | 12/1950 | Zink .......................... 248/276.1 |
| 4,583,155 A | | 4/1986 | Hart |
| 4,707,014 A | | 11/1987 | Rich |
| 4,787,665 A | | 11/1988 | Rich |
| 5,211,466 A | | 5/1993 | Jarocki et al. |
| 5,560,701 A | | 10/1996 | Payne |
| 5,576,900 A | | 11/1996 | Baumler et al. |
| 5,867,328 A | | 2/1999 | Stapp et al. |
| 5,971,552 A | | 10/1999 | O'Farrell et al. |
| 5,988,839 A | | 11/1999 | Pokorney et al. |
| 6,116,743 A | | 9/2000 | Hoek |
| 6,505,943 B1 | | 1/2003 | Olijnyk et al. |
| 6,637,806 B2 | | 10/2003 | Kazama |
| 6,663,271 B1 | | 12/2003 | Giglio |
| 6,906,632 B2 | | 6/2005 | DeLine et al. |
| 7,035,678 B2 | | 4/2006 | Lynam et al. |

(Continued)

*Primary Examiner* — H Gutman
(74) *Attorney, Agent, or Firm* — Lafkas LLC; David M. Lafkas

(57) ABSTRACT

An assembly configured to be attachable to a front portion of a frame for a vehicle, wherein a longitudinal axis extends through the assembly. The assembly includes: a first cross member oriented substantially perpendicular to the longitudinal axis positioned at a forward end of the assembly; a first side member attached to a first end of the first cross member at a first end thereof, the first side member extending rearward and upward therefrom; a second side member attached to a second end of the first cross member at a first end thereof, the second side member extending rearward and upward therefrom; a second cross member connected to a second end of the first side member at a first end thereof and to a second end of the second side member at a second end thereof wherein an open area is defined by the first cross member, the first side member, the second side member, and the second cross member; a first side mirror assembly movably attachable to the first side member, and, a second side mirror assembly movably attachable to the second side member. In this way, the first and second side mirror assemblies are adjustable to a desired position.

16 Claims, 25 Drawing Sheets

U.S. PATENT DOCUMENTS

| | | |
|---|---|---|
| 2004/0057139 A1 | 3/2004 | Shinohara |
| 2004/0090690 A1 | 5/2004 | Schuurmans et al. |
| 2004/0129853 A1 | 7/2004 | Suzuki et al. |
| 2004/0218297 A1 | 11/2004 | Sakata et al. |
| 2004/0246607 A1 | 12/2004 | Watson et al. |

* cited by examiner

ASSEMBLY FOR VEHICLES INCLUDING ADJUSTABLE MIRRORS

CROSS-REFERENCE TO RELATED APPLICATIONS

Applicants claim the benefit of a provisional application, Ser. No. 60/802,299, entitled "Automotive Visibility System/ AVS," which was filed on May 22, 2006.

BACKGROUND OF THE INVENTION

The present invention relates generally to vehicles and, in particular, to the safety mechanisms provided on such vehicles.

It will be understood that the manufacture of vehicles involves an assembly process requiring a number of operations or steps. Capital and labor costs associated with the assembly process are relatively large, so efforts are continually made to minimize the number of operations, as well as the time needed to carry them out Therefore, it is helpful to produce various subassemblies involving several operations off site and then including the subassembly to the vehicle as a unit To the extent this is accomplished, substantial cost savings may be realized.

Another ongoing concern for the operation of vehicles is to improve the safety of both the person driving the vehicle and those in the immediate area thereof. While various types of accessories, including lights, mirrors, and the like, have been utilized to assist in this endeavor, improvements in the exterior lighting systems and mirror assemblies have not been provided in a convenient package. Moreover, flexibility regarding their configuration and positioning has been unsatisfactory.

Thus, it would be desirable for an assembly to be developed which both assists in the efficiency of the assembly process, as well as provides increased safety and flexibility. It is also desirable for such assembly to be provided in a manner which is compatible with the vehicle and aesthetically pleasing. Further, it is desirable for the assembly to be compatible with all types of vehicles.

BRIEF SUMMARY OF THE INVENTION

In accordance with a first exemplary embodiment of the invention, an assembly configured to be attachable to a front portion of a frame for a vehicle is disclosed, wherein a longitudinal axis extends through the assembly. The assembly includes: a first cross member oriented substantially perpendicular to the longitudinal axis positioned at a forward end of the assembly; a first side member attached to a first end of the first cross member at a first end thereof, the first side member extending rearward and upward therefrom; a second side member attached to a second end of the first cross member at a first end thereof the second side member extending rearward and upward therefrom; a second cross member connected to a second end of the first side member at a first end thereof and to a second end of the second side member at a second end thereof wherein an open area is defined by the first cross member, the first side member, the second side member, and the second cross member; a first side mirror assembly movably attachable to the first side member; and, a second side mirror assembly movably attachable to the second side member. In this way, the first and second side mirror assemblies are adjustable to a desired position. Each of the first and second side mirror assemblies further include: a track mechanism provided along one of the first and second side members; a side mirror housing; and, a rod member connected to the side mirror housing at a first end and coupled to the track mechanism at a second end.

In a second exemplary embodiment of the invention, an assembly configured to be attachable to a front portion of a frame for a vehicle is disclosed, wherein a longitudinal axis extends through the assembly. The assembly includes: a first cross member oriented substantially perpendicular to the longitudinal axis positioned at a forward end of the assembly; a first side member attached to a first end of the first cross member at a first end thereof, the first side member extending rearward and upward therefrom; a second side member attached to a second end of the first cross member at a first end thereof, the second side member extending rearward and upward therefrom; a second cross member connected to a second end of the first side member at a first end thereof and to a second end of the second side member at a second end thereof, wherein an open area is defined by the first cross member, the first side member, the second side member, and the second cross member; a substantially planar member attached to and extending rearward from the second cross member; a module affixed to a top surface of the planar member; a first side mirror assembly movably attachable to a first side of the module; and, a second side mirror assembly movably attachable to a second side of the module. In this way, the first and second side mirror assemblies are adjustable to a desired position The first and second side mirror assemblies each further include: a rod member retractably coupled to an inner cavity in the module at a first end; and, a side mirror housing attached to the rod member at a second end.

In a third exemplary embodiment of the invention, an assembly configured to be attachable to a front portion of a frame for a vehicle is disclosed, wherein a longitudinal axis extends through the assembly. The assembly includes: a first cross member oriented substantially perpendicular to the longitudinal axis positioned at a forward end of the assembly; a first side member attached to a first end of the first cross member at a first end thereof, the first side member extending rearward and upward therefrom; a second side member attached to a second end of the first cross member at a first end thereof, the second side member extending rearward and upward therefrom; a second cross member connected to a second end of the first side member at a first end thereof and to a second end of the second side member at a second end thereof, wherein an open area is defined by the first cross member, the first side member, the second side member, and the second cross member; a substantially planar member attached to and extending rearward from the second cross member; and, a module affixed to a top surface of the planar member, the module including a light incorporated therein facing rearward that is indicative of brake actuation.

DETAILED DESCRIPTION OF THE INVENTION

Figure 1:
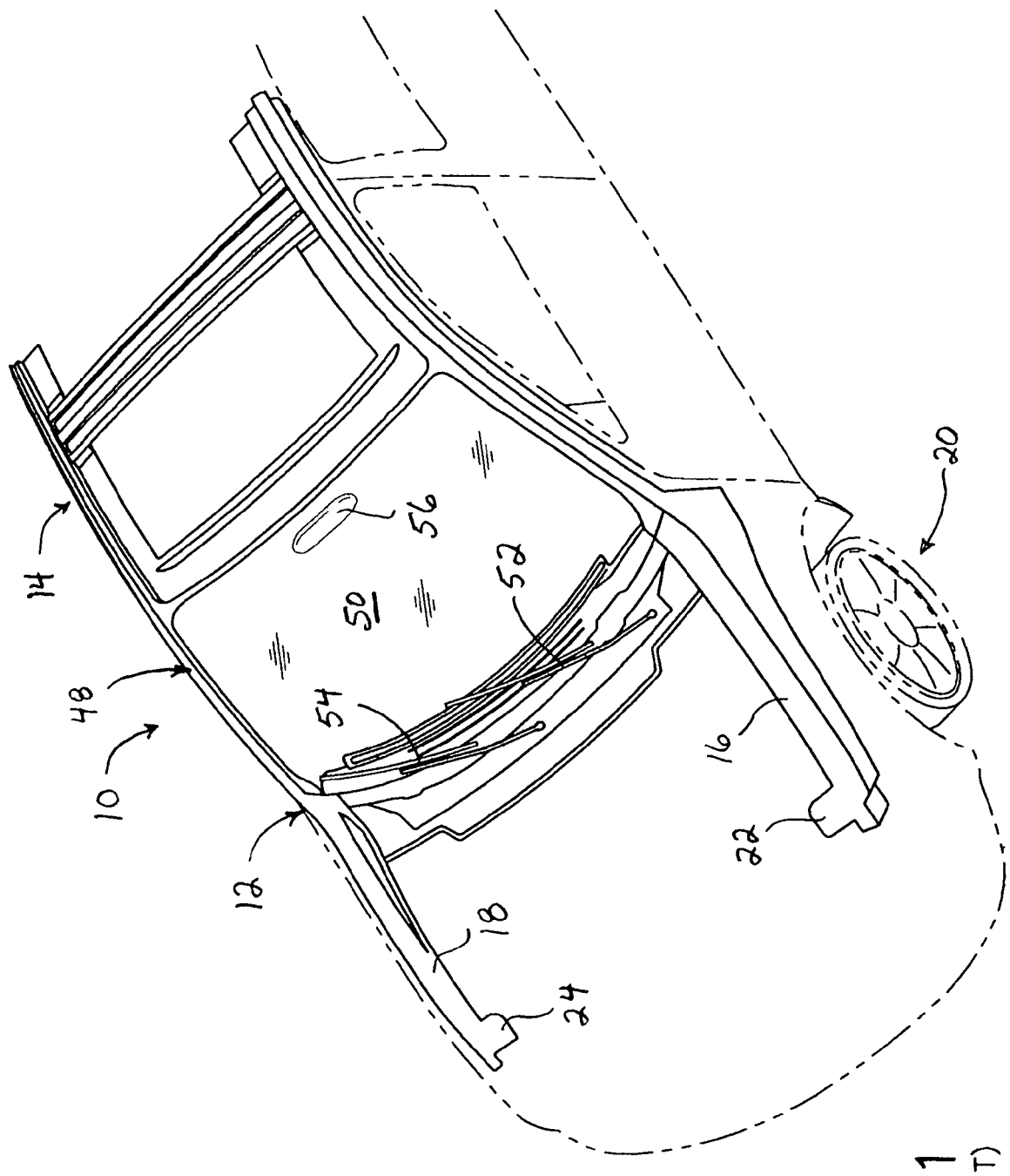
FIG. 1 is a partial perspective view of an automobile, where certain portions thereof unrelated to the present invention are shown in phantom.
Figure 2:
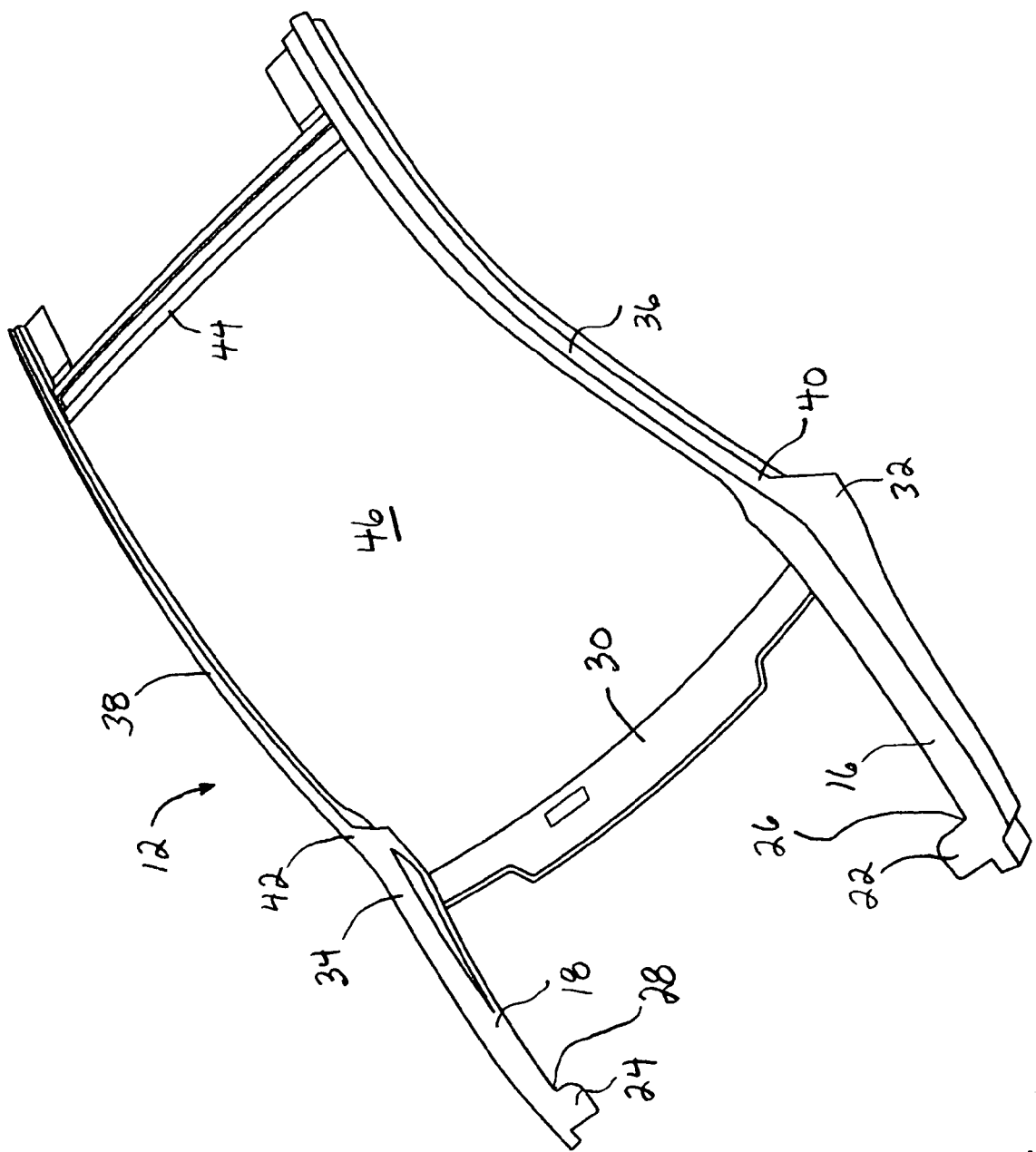
FIG. 2 is a partial perspective view of the automobile frame depicted in FIG. 1.

Referring now to the drawings in detail, wherein identical numerals indicate the same elements throughout the figures, FIG. 1 depicts a partial view of an exemplary vehicle 10, with a forward portion 12 of a frame 14 being shown in solid lines. As seen therein, forward frame portion 12 further includes a pair of side rails 16 and 18 which extend over a front wheel base 20. Side rails 16 and 18 preferably have flange members 22 and 24, respectively, extending inwardly from first ends 26 and 28 thereof. A cross member 30 extends transversely across vehicle 10 to attach to second ends 32 and 34 of side rails 16 and 18. It will be seen that first and second side members 36 and 38 are also connected to second ends 32 and 34 of first and second side rails 16 and 18 at first ends 40 and 42, where side members 36 and 38 extend rearward and upward therefrom. It will be appreciated that side members 36 and 38 are typically known as "A pillars" within the industry. A second cross member 44 is spaced from first cross member 30 and attached to side members 36 and 38 to preferably define an open area 46. It will be appreciated that forward frame portion 12 is configured to receive a windshield assembly 48, which typically includes a windshield 50, wiper blades 52 and 54, a rear view mirror 56, and various other items not shown. FIG. 2 depicts forward frame portion 12 without windshield assembly 48.

Figure 3:
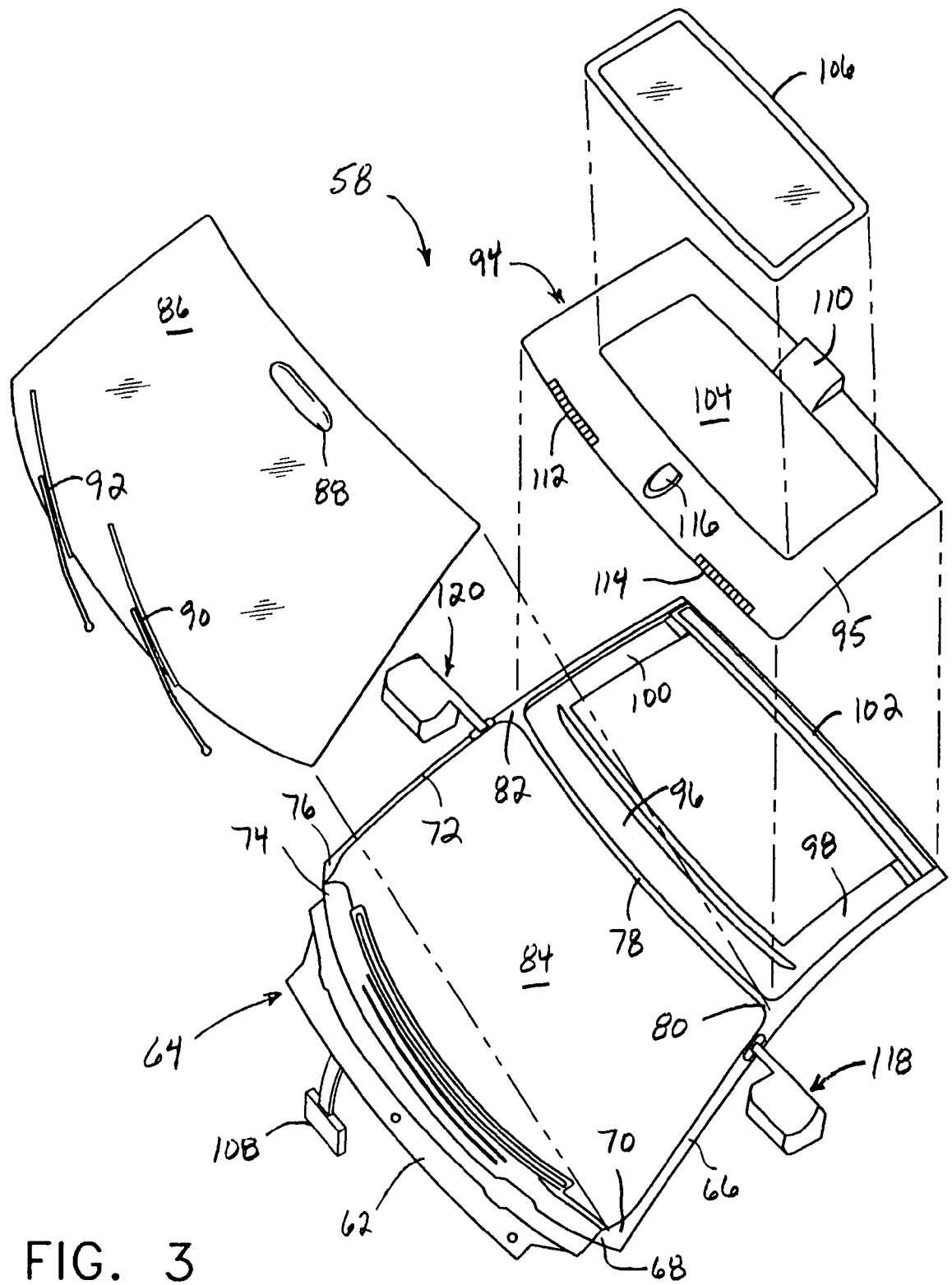
FIG. 3 is an exploded perspective view of an assembly in accordance with the present invention utilized with the automobile frame depicted in FIG. 2.
Figure 4:
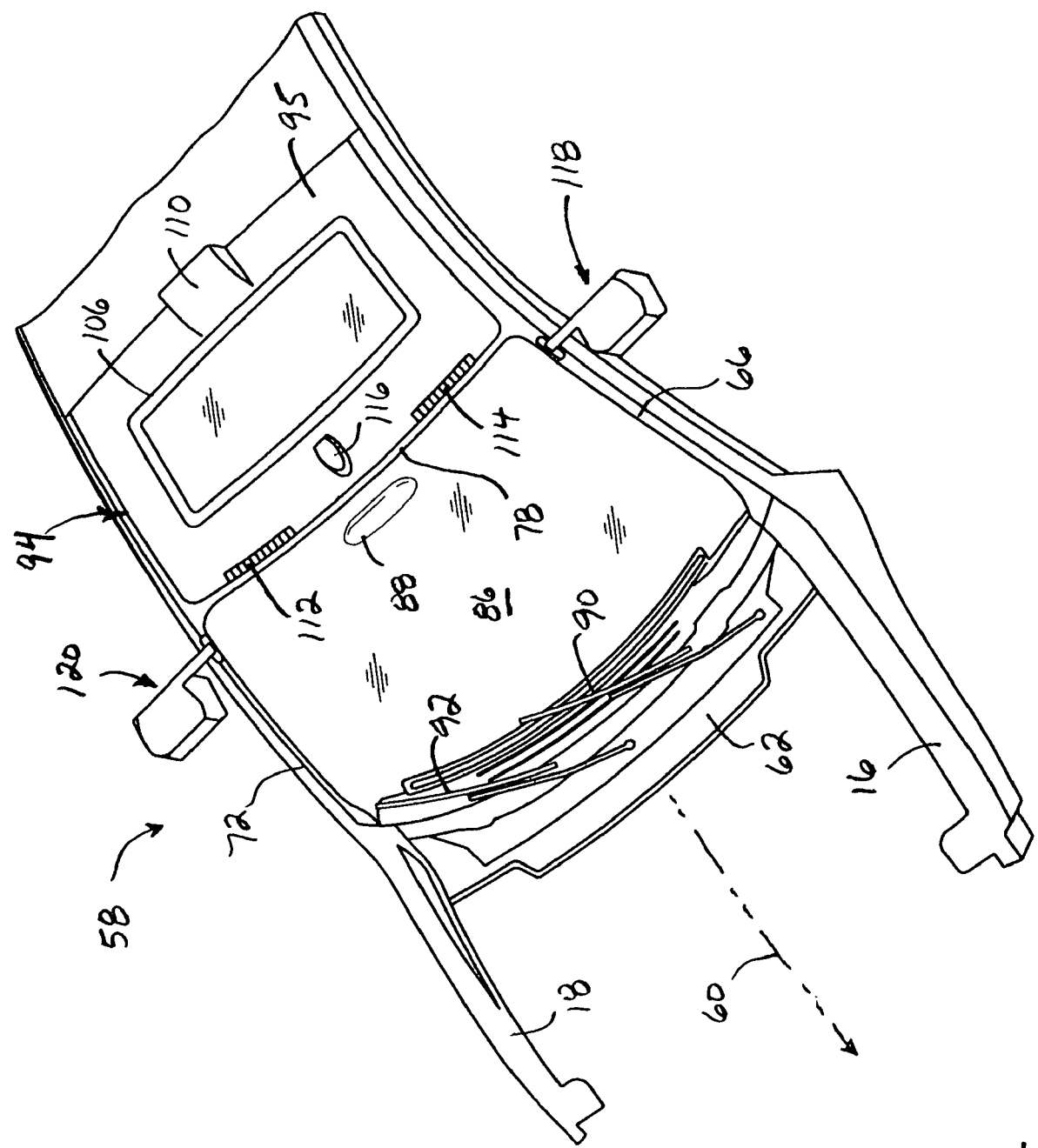
FIG. 4 is a perspective view of the assembly depicted in FIG. 3 positioned within the automobile frame depicted in FIG. 2.
Figure 5:
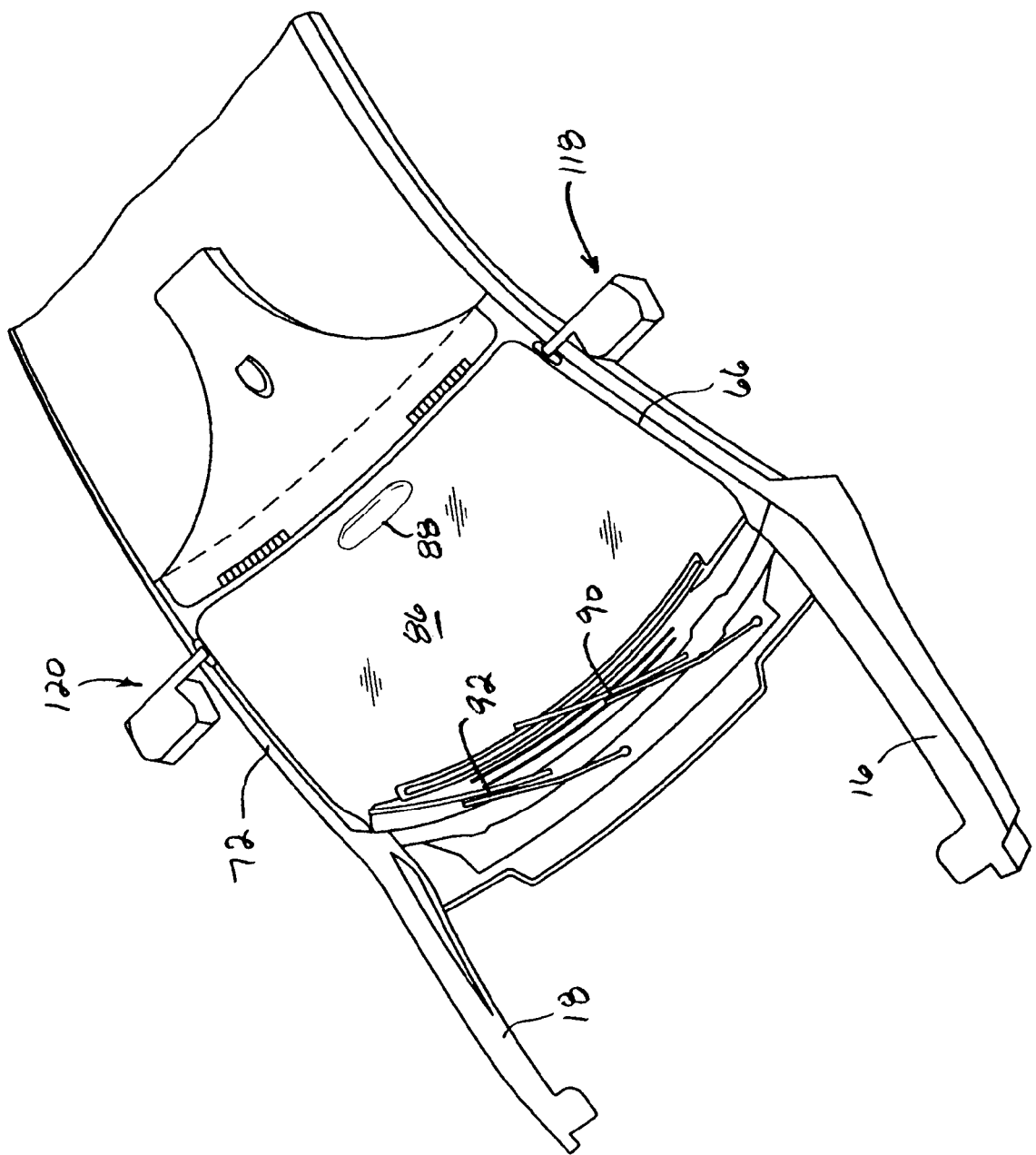
FIG. 5 is a perspective view of an alternative embodiment for the assembly depicted with the automobile frame depicted in FIG. 2.
Figure 6:
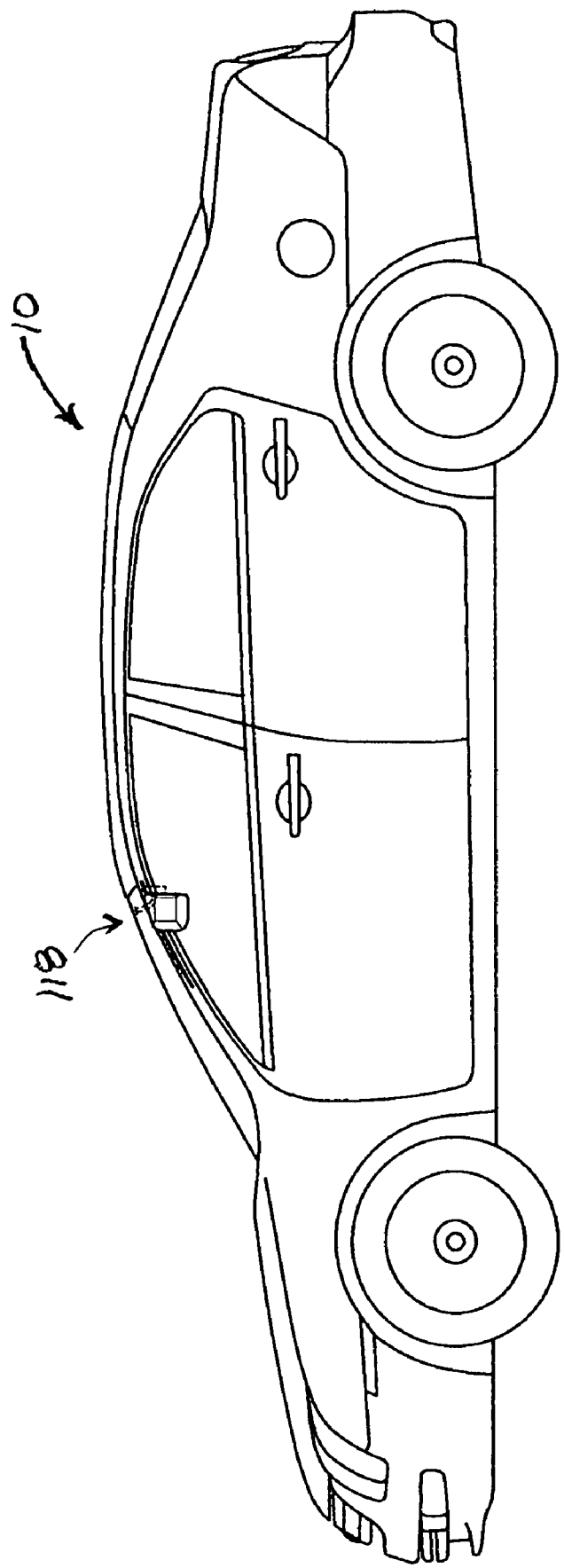
FIG. 6 is a side view of an automobile including an adjustable side mirror assembly in accordance with a second embodiment of the invention.
Figure 7:
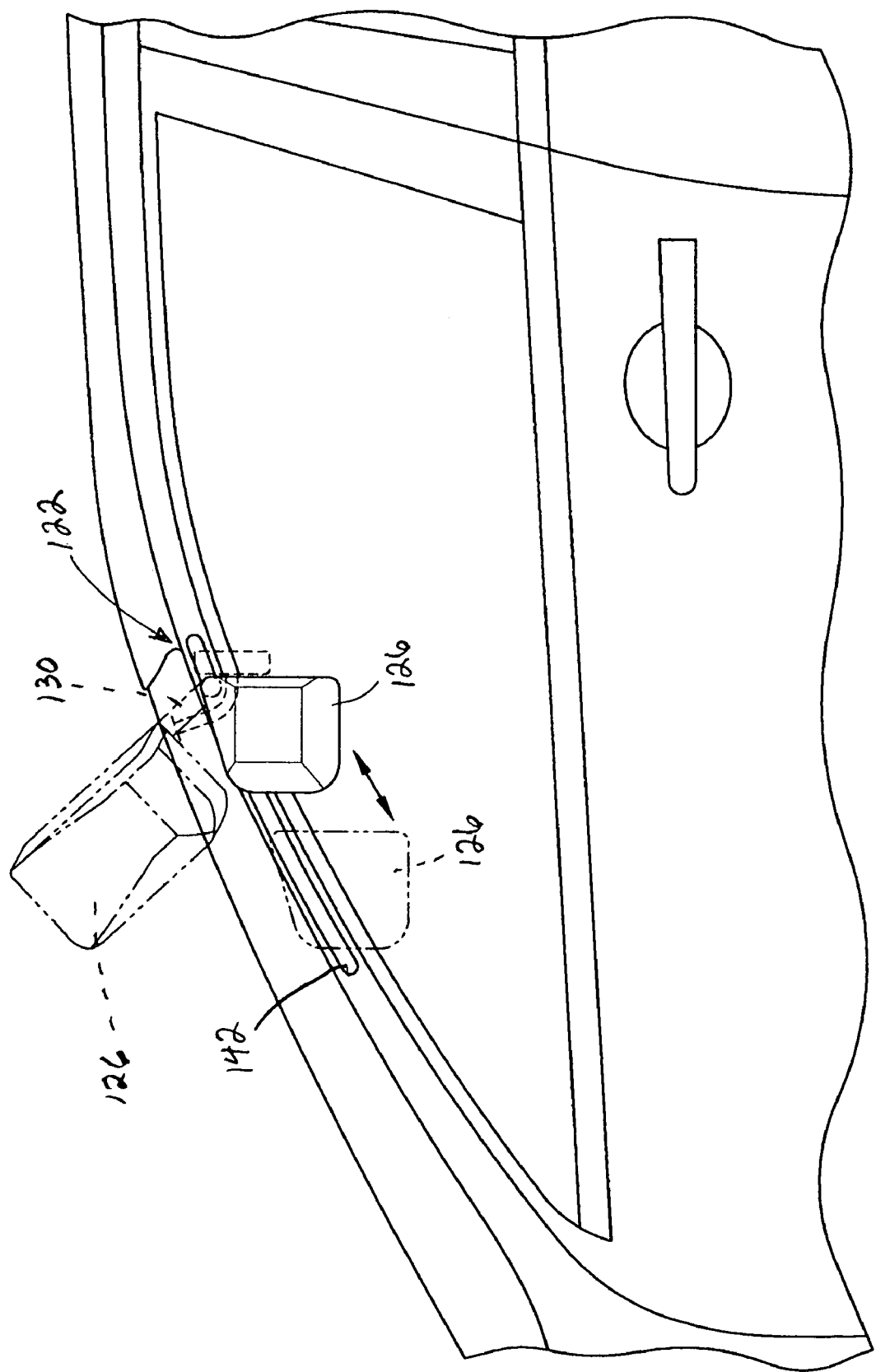
FIG. 7 is an enlarged partial side view of the side mirror assembly depicted in FIG. 6, where the adjustments to the position of the side mirror are shown in phantom.
Figure 8:
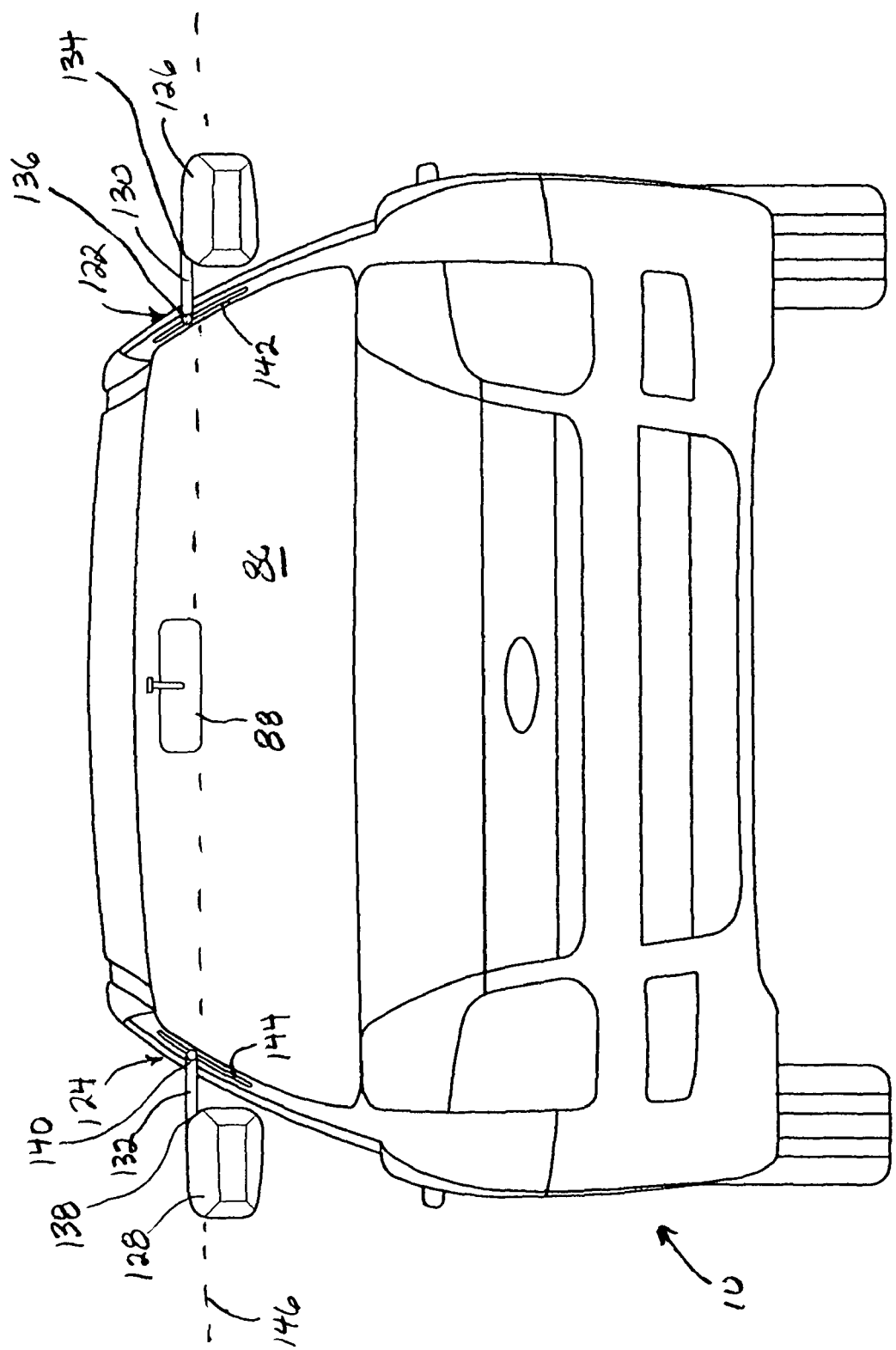
FIG. 8 is a front view of the automobile depicted in FIG. 6.

In accordance with one embodiment of the present invention, a new windshield assembly 58 including a longitudinal axis 60 therethrough is depicted in FIG. 3. As seen therein, windshield assembly 58 preferably includes a first cross member 62 oriented substantially perpendicular to longitudinal axis 60 and positioned at what will be identified herein as a forward end 64 of windshield assembly 58. A first side member 66 is preferably attached to a first end 68 of first cross member 62 at a first end 70 thereof, where it will be seen that first side member 66 extends rearward and upward therefrom. Likewise, a second side member 72 is preferably attached to a second end 74 of first cross member 62 at a first end 76 thereof with second side member 72 also extending rearward and upward therefrom. First and second side members 66 and 72 preferably are generally oriented in substantially parallel relation to one another, although a slight inward skew is typically present. A second cross member 78 is connected to first side member 66 at a first end 80 and to second side member 72 at a second end 82 so that an open area 84 is preferably defined between first and second cross members 62 and 78 and first and second side members 66 and 72.

It will be appreciated that windshield assembly 58 is preferably configured so that first cross member 62 is attachable to first cross member 30 of front frame portion 12, second cross member 78 is attachable to second cross member 44, first side member 66 is attachable to first side member 36, and second side member 72 is attachable to second side member 38. Thus, windshield assembly 58 will preferably conform to the size and shape of front frame portion 12.

A windshield 86, preferably including a rear view mirror 88 attached to an upper central area of an inner surface thereof, is provided to cover open area 84. Wiper blades 90 and 92 are preferably attached to first cross member 62. In addition, a module 94 is preferably provided to windshield assembly 58. Flange members 96, 98 and 100 are shown as extending inwardly from second cross member 78, first side member 66 and second side member 72, respectively, and provide support for module 94 along with a third cross member 102. Module 94 may include an open area 104 formed therein so as to accommodate a sun roof assembly 106.

Module 94 includes a housing 95 which is preferably configured to be aerodynamic. Module housing 95 preferably contains various electrical components (e.g., wiring harnesses, switches, sensors, etc.) therein, and a power connector 108 is shown for accessing power. More specifically, it will be seen that one component associated with module 94 is a rearward facing light 110 that is preferably indicative of brake actuation in vehicle 10. Light 110 is preferably positioned on vehicle 10 and configured so as to be consistent with being a Center High Mounted Stop Lamp (CHMSL) as required by Federal Motor Vehicle Safety Standard 108.

In addition, one or more forward facing lights 112 and 114 are shown as being associated with module 94, such lights also being known as marker or running lights. An antenna system for radio or GPS may also be associated with module 94, as represented by an antenna housing 116 shown on module housing 95.

It will further be appreciated that windshield assembly 58 preferably includes a first side mirror assembly 118 movably attachable to first side member 66 and a second side mirror assembly 120 movably attachable to second side member 72. It will be appreciated that first and second side mirror assemblies 118 and 120 are adjustable so as to be in a desired position. More specifically, first and second side mirror assemblies 118 and 120 are adjustable to a position having a desired height relative to longitudinal axis 60, as well as a desired location along longitudinal axis 60.

As best seen in FIGS. 6-11, first and second side mirror assemblies 118 and 120 each include a track mechanism 122 and 124 provided along first and second side members 66 and 72, respectively. Each of first and second side mirror assemblies 118 and 120 further includes a side mirror housing 126 and 128, respectively, as well as a rod member 130 and 132. It will be understood that rod member 130 is connected to side mirror housing 126 at a first end 134 and coupled to track mechanism 122 at a second end 136. Similarly, rod member 132 is connected to side mirror housing 128 at a first end 138 and coupled to track mechanism 124 at a second end 140. In this way, first and second side mirror housings 126 and 128 are movable between a first position and a second position, the length therebetween being dictated by the track mechanisms 122 and 124 and the length of slots 142 and 144 formed in first and second side members 66 and 72. It is further preferred that first and second mirror housings 126 and 128 be positionable in a substantially horizontal plane 146 with rear view mirror 88.

It will be seen that rod members 130 and 132 are preferably connected to an upper portion of side mirror housings 126 and 128, respectively. Accordingly, side mirror housings 126 and 128 extends below first and second side members 66 and 72. In order to accommodate the opening and closing of doors on vehicle 10, it is preferred that rod members 130 and 132 be pivotably coupled to track mechanisms 122 and 124, respectively. In addition, first and second side mirror housings 126 and 128 may be pivotable with respect to rod members 130 and 132, respectively.

Figure 9:
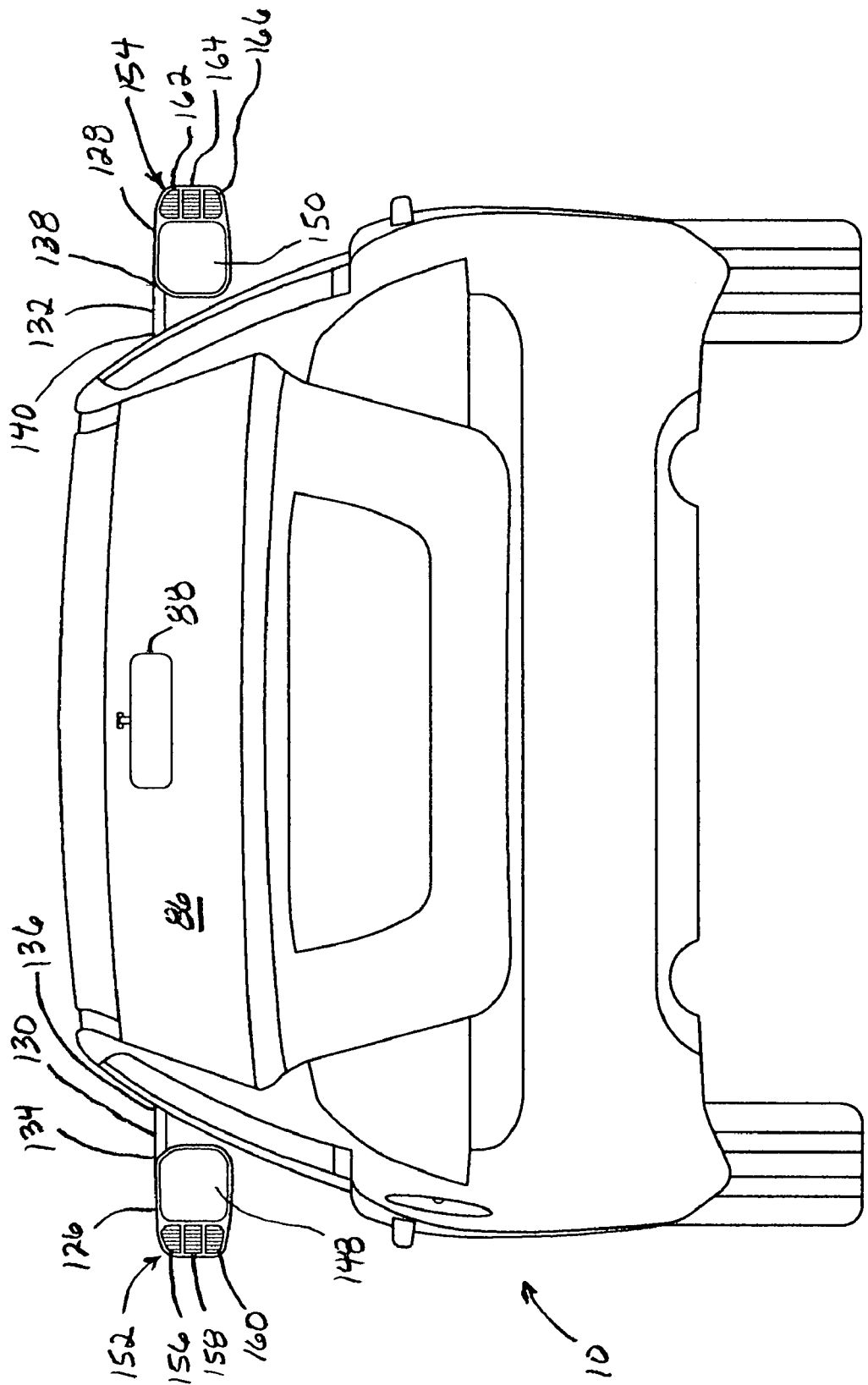
FIG. 9 is a rear view of the automobile depicted in FIGS. 6 and 8.
Figure 10:
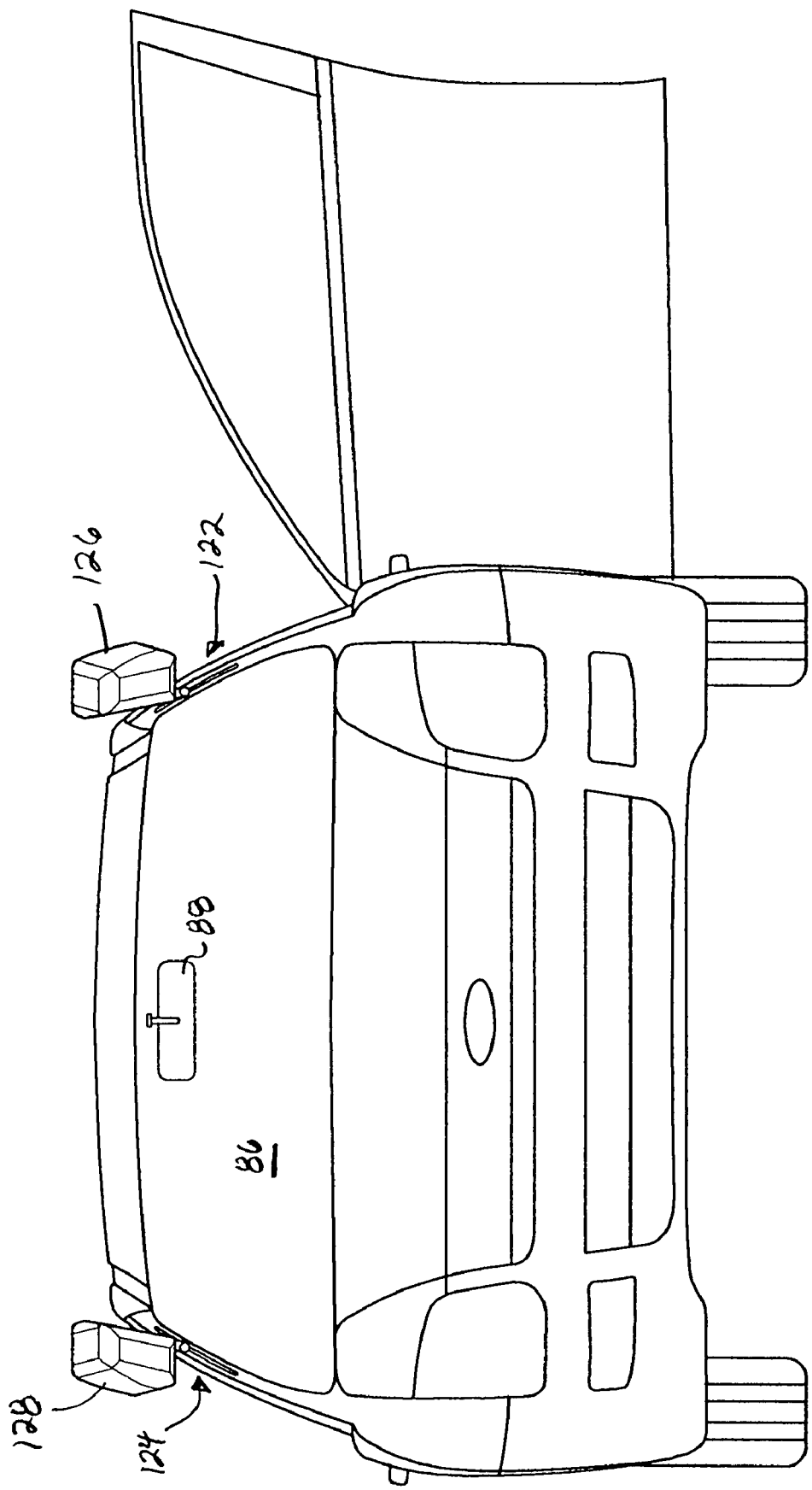
FIG. 10 is a front view of the automobile depicted in FIGS. 6, 8 and 9, where the side mirror assemblies are in a rotated position allowing the door to open and close.
Figure 11:
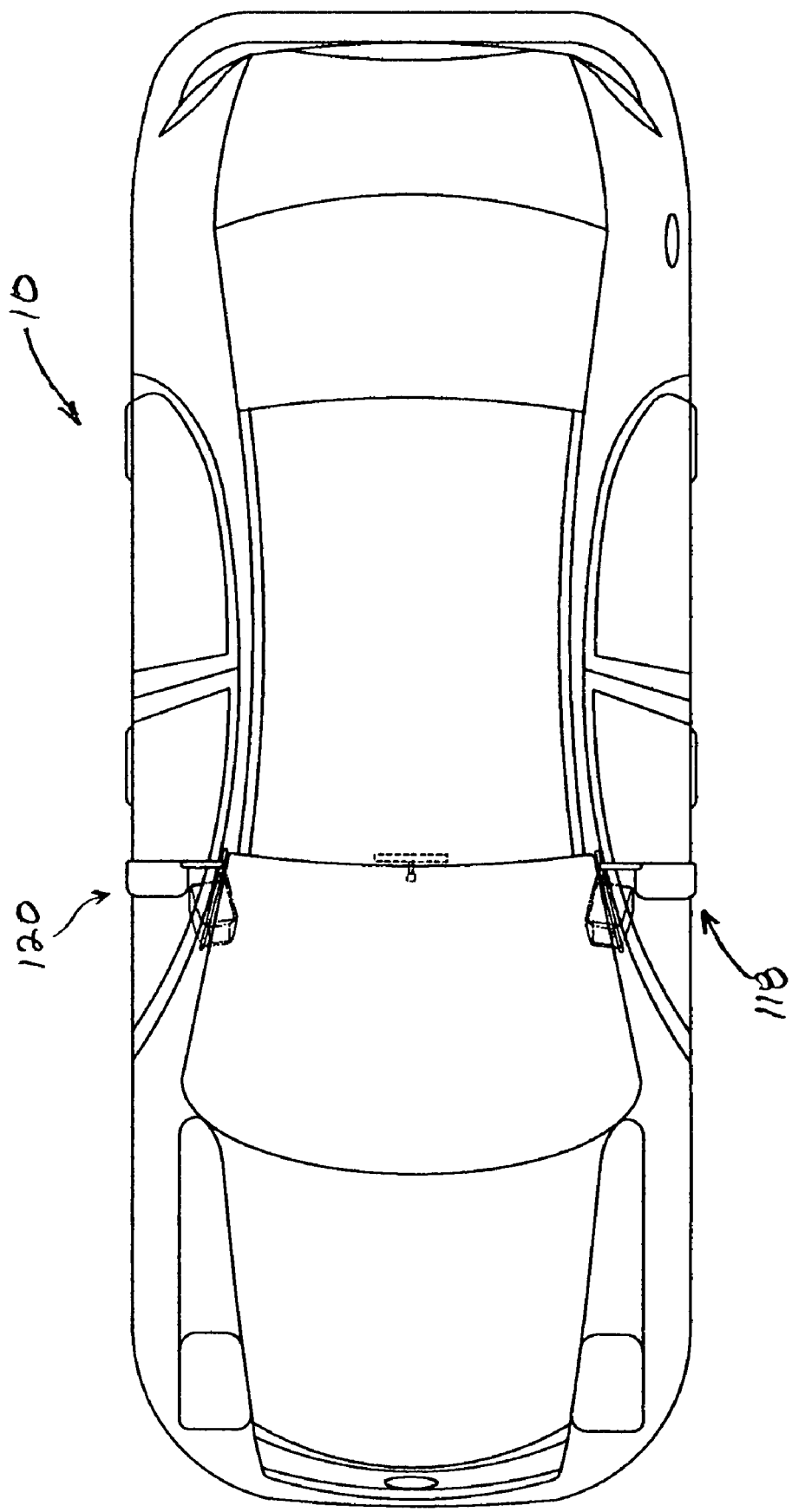
FIG. 11 is a top view of the automobile depicted in FIGS. 6 and 8-10, where the side mirror assemblies are shown in the drive position and the rotated position.
Figure 12:
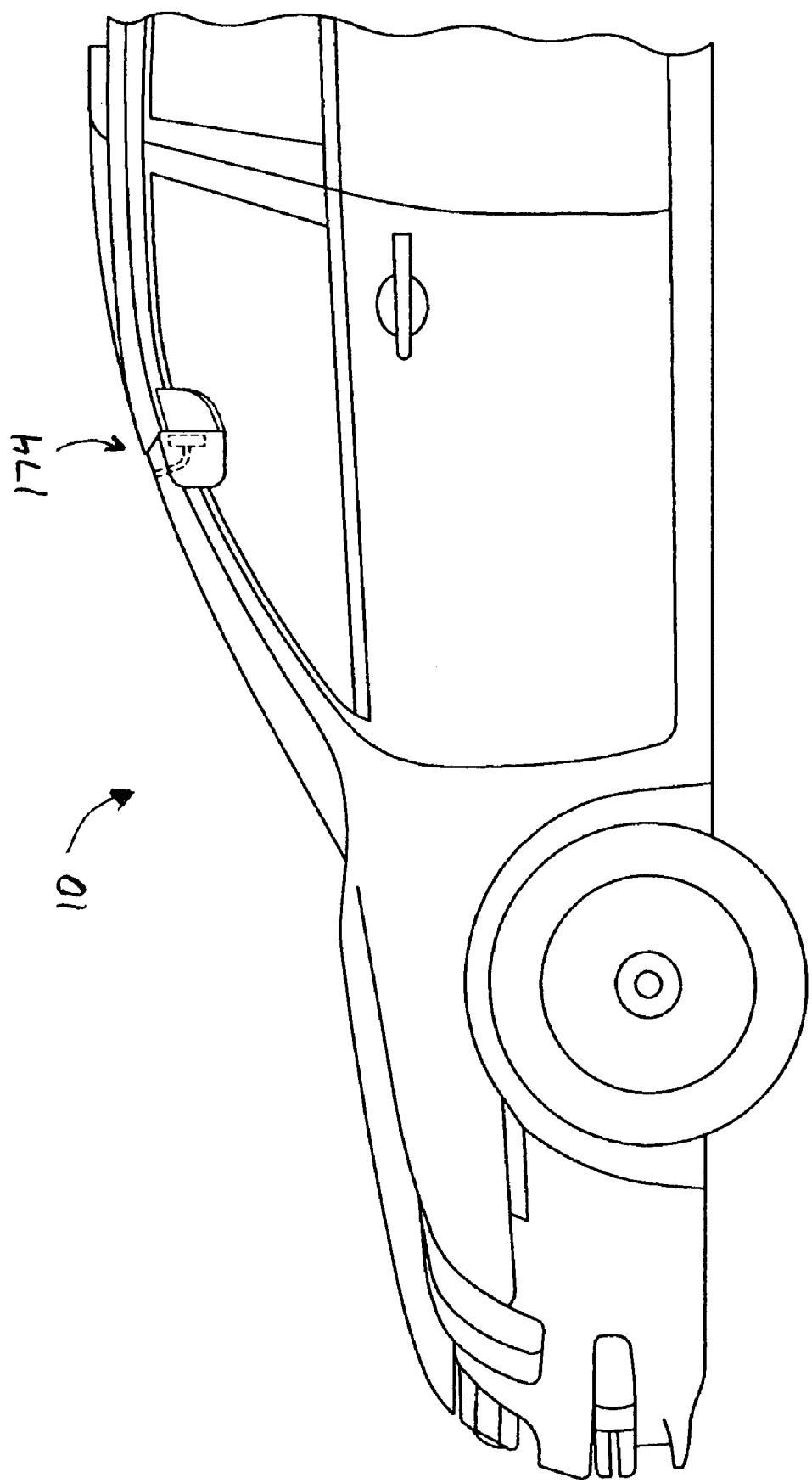
FIG. 12 is a partial side view of an automobile including adjustable side mirror assemblies of a second embodiment.
Figure 13:
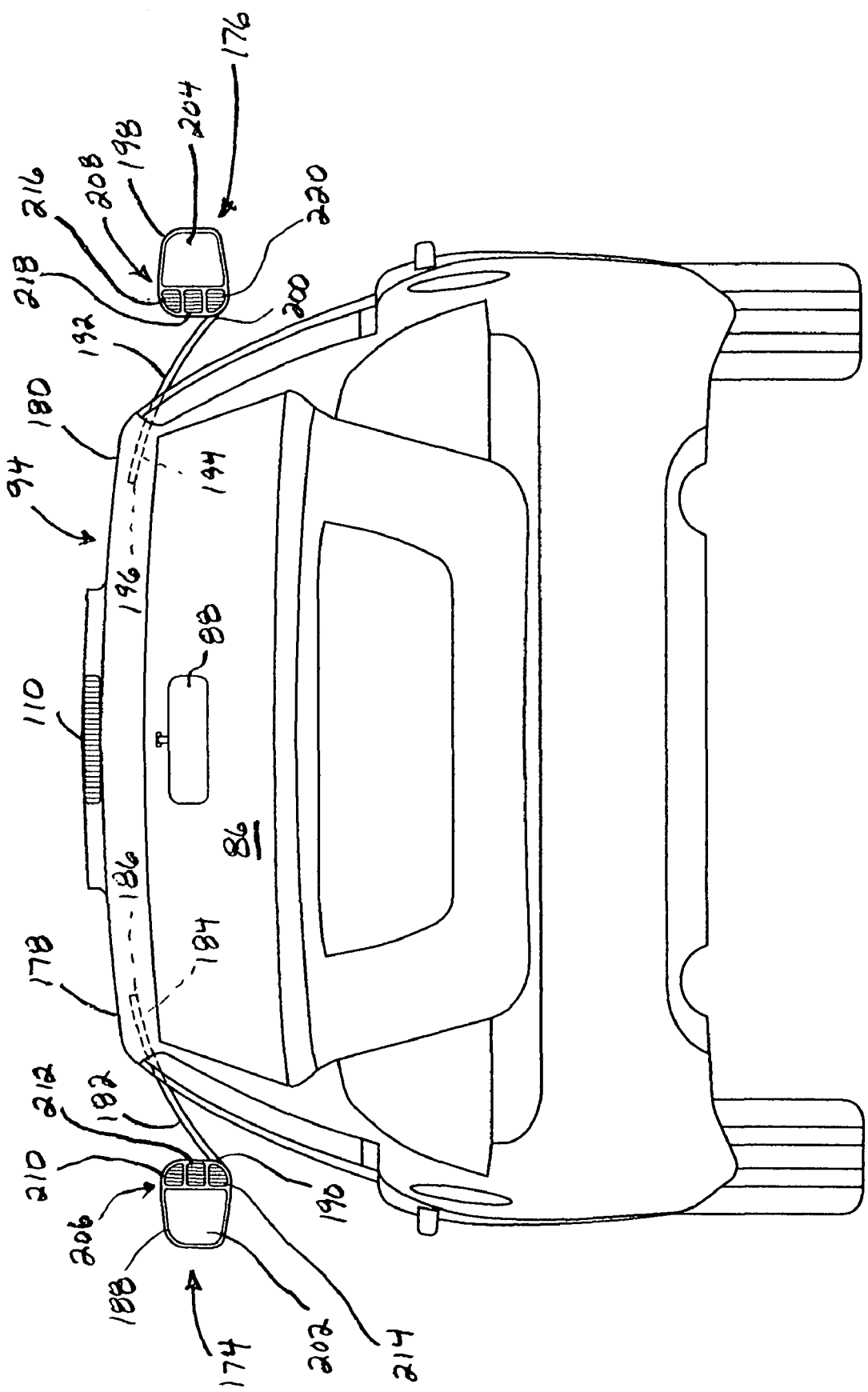
FIG. 13 is a rear view of the automobile depicted in FIG. 12, where the side mirror assemblies are in the extended drive position.
Figure 14:
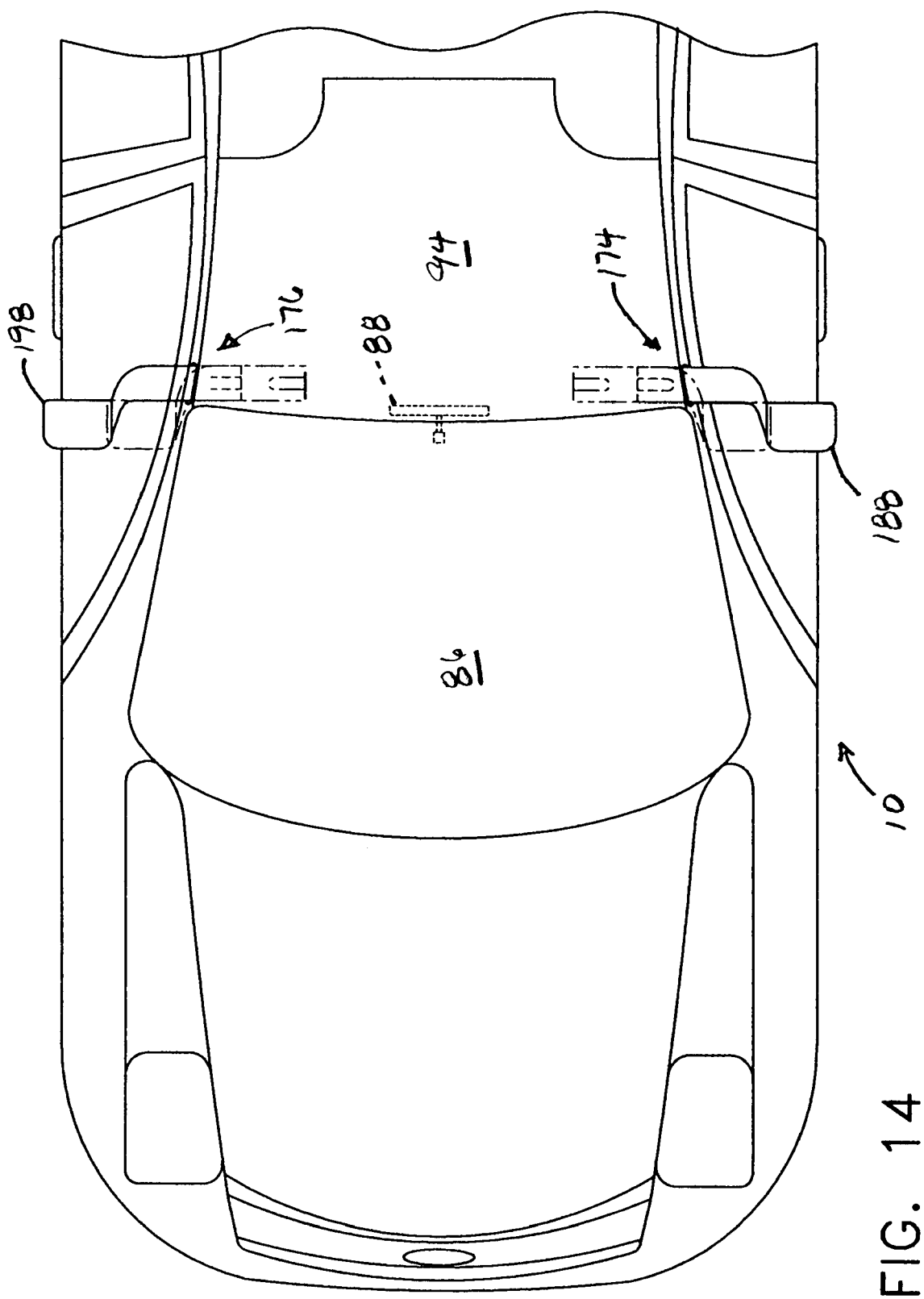
FIG. 14 is a partial top view of the automobile depicted in FIGS. 12 and 13.
Figure 15:
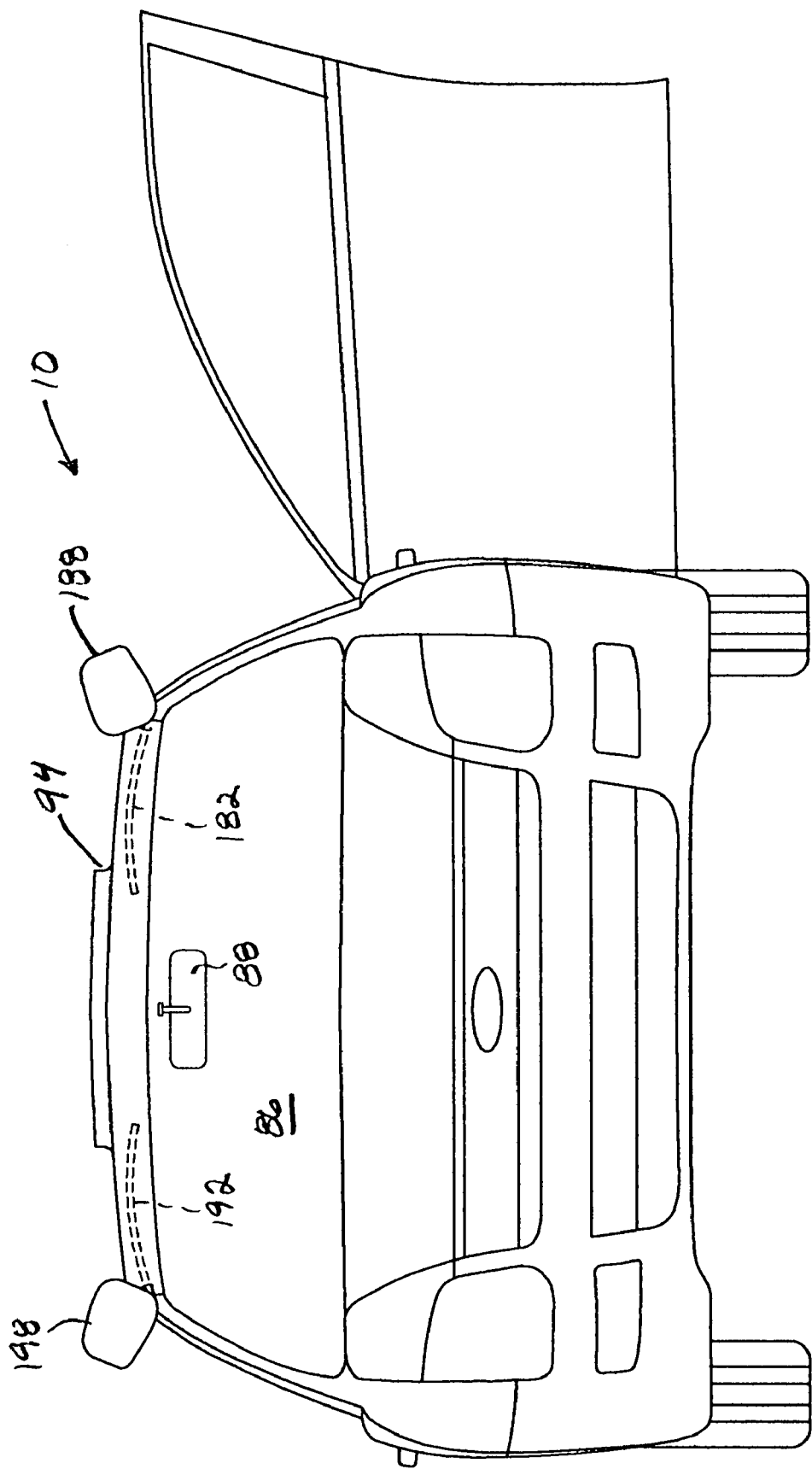
FIG. 15 is a front view of the automobile depicted in FIGS. 12-14, where the side mirror assemblies are in the retracted position.
Figure 25:
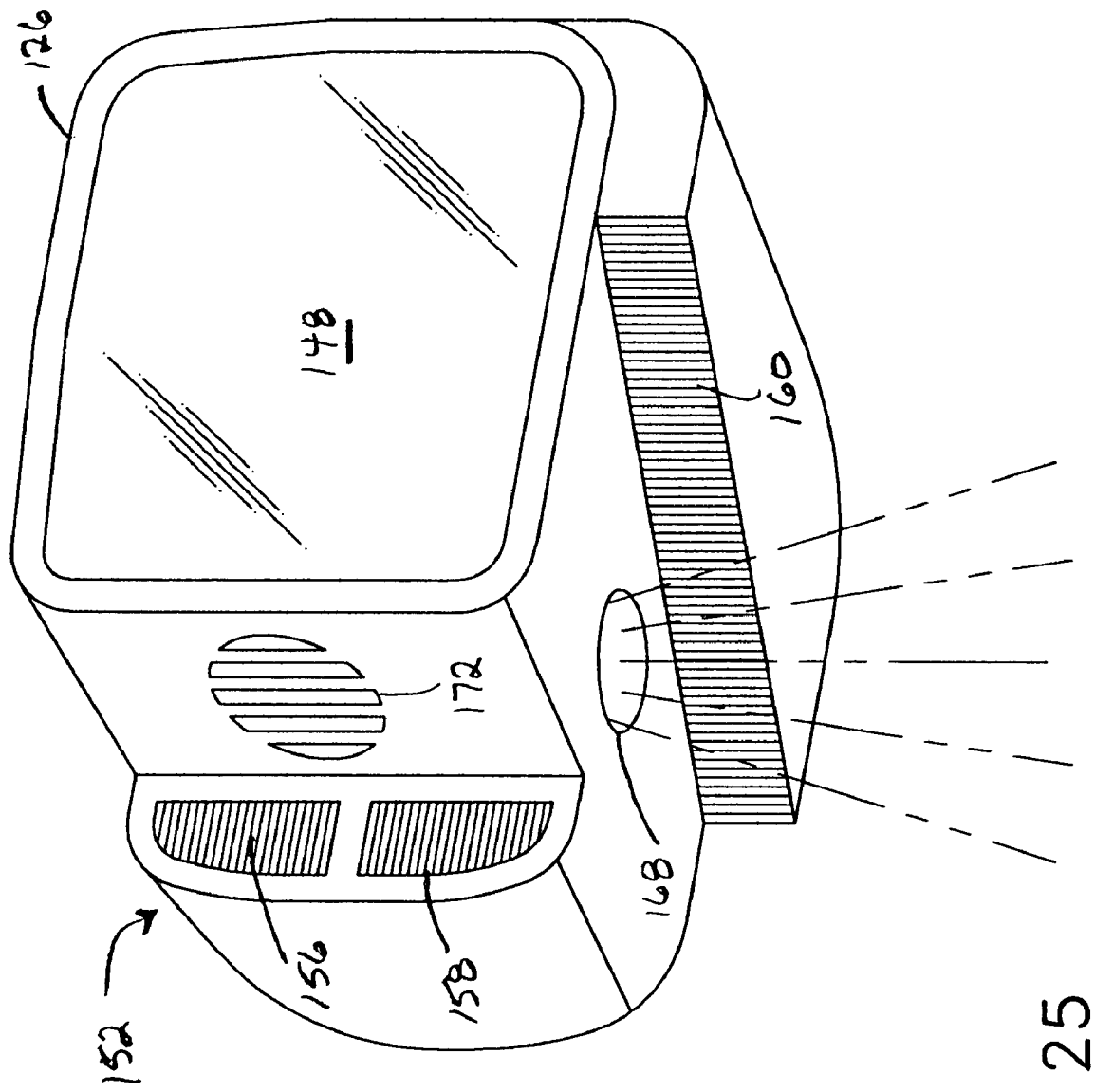

First and second side mirror housings 126 and 128 further include mirrors 148 and 150 positioned along a rear portion thereof and facing rearward. Lighting packages 152 and 154 are preferably included with first and second side mirror housings 126 and 128, respectively. As seen in FIG. 9, lighting packages 152 and 154 are preferably located outward of side mirrors 148 and 150. Lighting package 152 includes a first light 156 indicative of a directional signal, a second light 158 indicative of brake activation, and a third light 160 indicative of vehicle 10 being in reverse. Similarly, lighting package 154 includes a first light 162 indicative of a directional signal, a second light 164 indicative of brake activation, and a third light 166 indicative of vehicle 10 being in reverse. Additional lights 168 and 170 may also be provided with a bottom portion of first and second side mirror housings 126 and 128 directed downward and are otherwise known as puddle lights. Another optional feature of first and second side mirror housings is to have a speaker 172 associated therewith, where speaker 172 is connected to a microphone (not shown) located within vehicle 10 (see FIG. 25).

FIGS. 12-15 depict a first alternative embodiment for the adjustable side mirror assemblies. As seen therein, first and second side mirror assemblies 174 and 176 are movably attachable to first and second sides 178 and 180 of module 94 so as to be adjustable to a desired position. More specifically, first side mirror assembly 174 includes a rod member 182 which is retractably coupled within a cavity 184 in module 94 at a first end 186. A side mirror housing 188 is attached to rod member 182 at a second end 190. Second side mirror assembly 176 includes a rod member 192 which is retractably coupled within a cavity 194 in module 94 at a first end 196. A second side mirror housing 198 is attached to rod member 192 at a second end 200. In this way, side mirror housings 188 and 198 are movable between an extended position and a retracted position.

It will be appreciated that rod members 182 and 192 are preferably nonlinear and attached to a lower portion of first and second side mirror housings 188 and 198, respectively. In this way, first side mirror housing 188 is positioned below first side member 66 when in the extended position and above first side member 66 when in the retracted position. Likewise, second mirror housing 198 is positioned below second side member 72 when in the extended position and above second side member 72 when in the retracted position. Although not shown, it is preferred that rod members 182 and 192 be actuated electronically, pneumatically, or in some similar manner. It is also preferred that first and second side mirror housings 188 and 198 automatically be retracted during certain vehicle conditions (i.e., when in park, the engine is turned off, etc.) when it is expected that the door will be opened or closed. Further, it is preferred that first and second side mirror housings 188 and 198 be in the extended position during certain other vehicle conditions (i.e., the engine is turned on). Other options contemplated but not shown herein include programming first and second side mirror housings 188 and 198 to a desired position and preventing the door of vehicle 10 from opening while first and second side mirror housings 188 and 198 are in the extended position.

It will be appreciated that mirrors 202 and 204 are positioned adjacent a rear portion of first and second side mirror housings 188 and 198, respectively, so as to be directed rearward. It is preferred that first and second side mirror housings 188 and 198 further include lighting packages 206 and 208 which are positioned adjacent to and inwardly from mirrors 202 and 204. In this way, the lights thereof are hidden from the driver's view. First lighting package 206 includes a first light 210 indicative of a directional signal, a second light 212 indicative of brake activation, and a third light 214 indicative of vehicle 10 being in reverse. Similarly, lighting package 208 includes a first light 216 indicative of a directional signal, a second light 218 indicative of brake activation, and a third light 220 indicative of vehicle 10 being in reverse.

Figure 16:
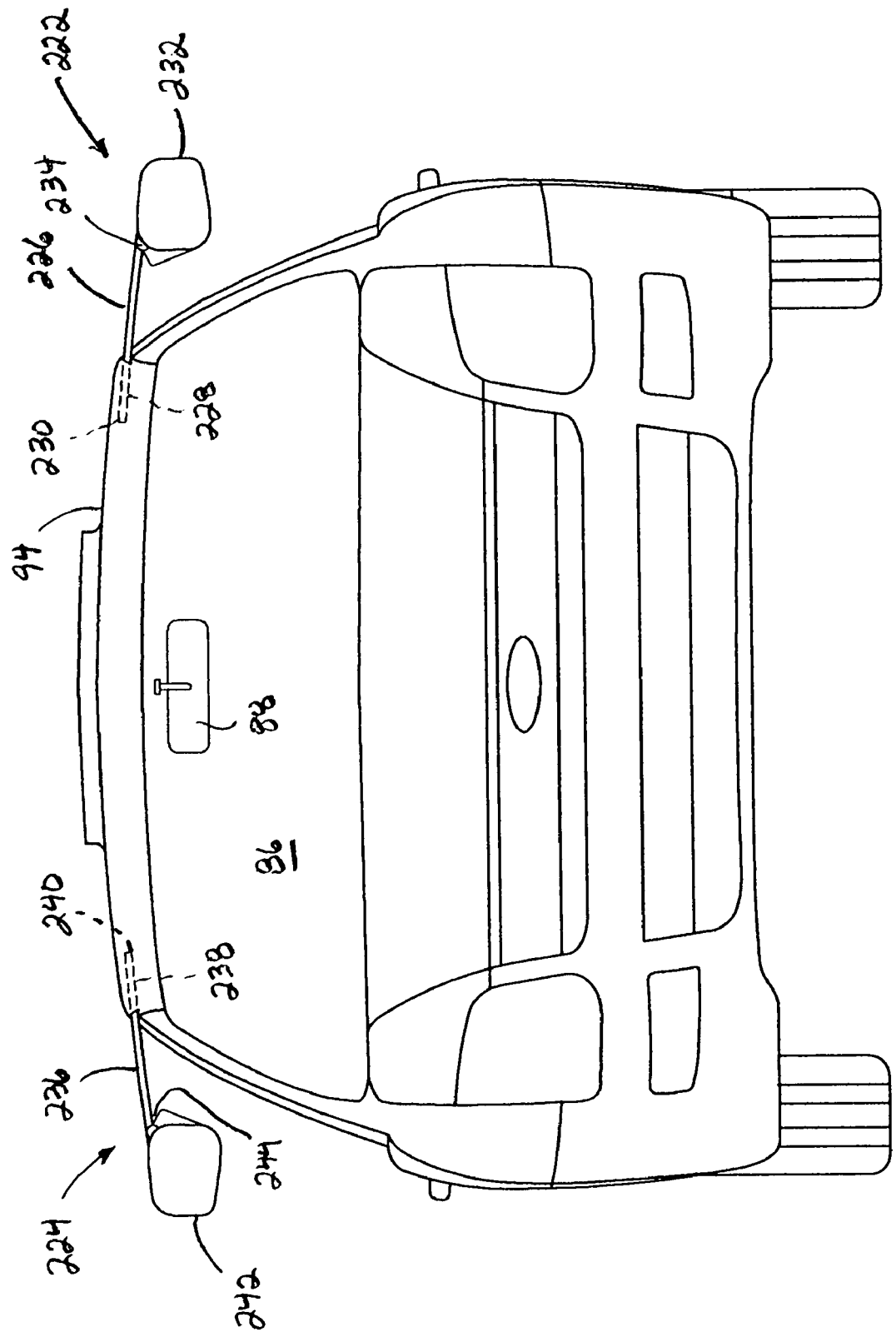
FIG. 16 is a front view of an automobile including adjustable side mirror assemblies of a third embodiment, where the side mirror assemblies are in the extended drive position.
Figure 17:
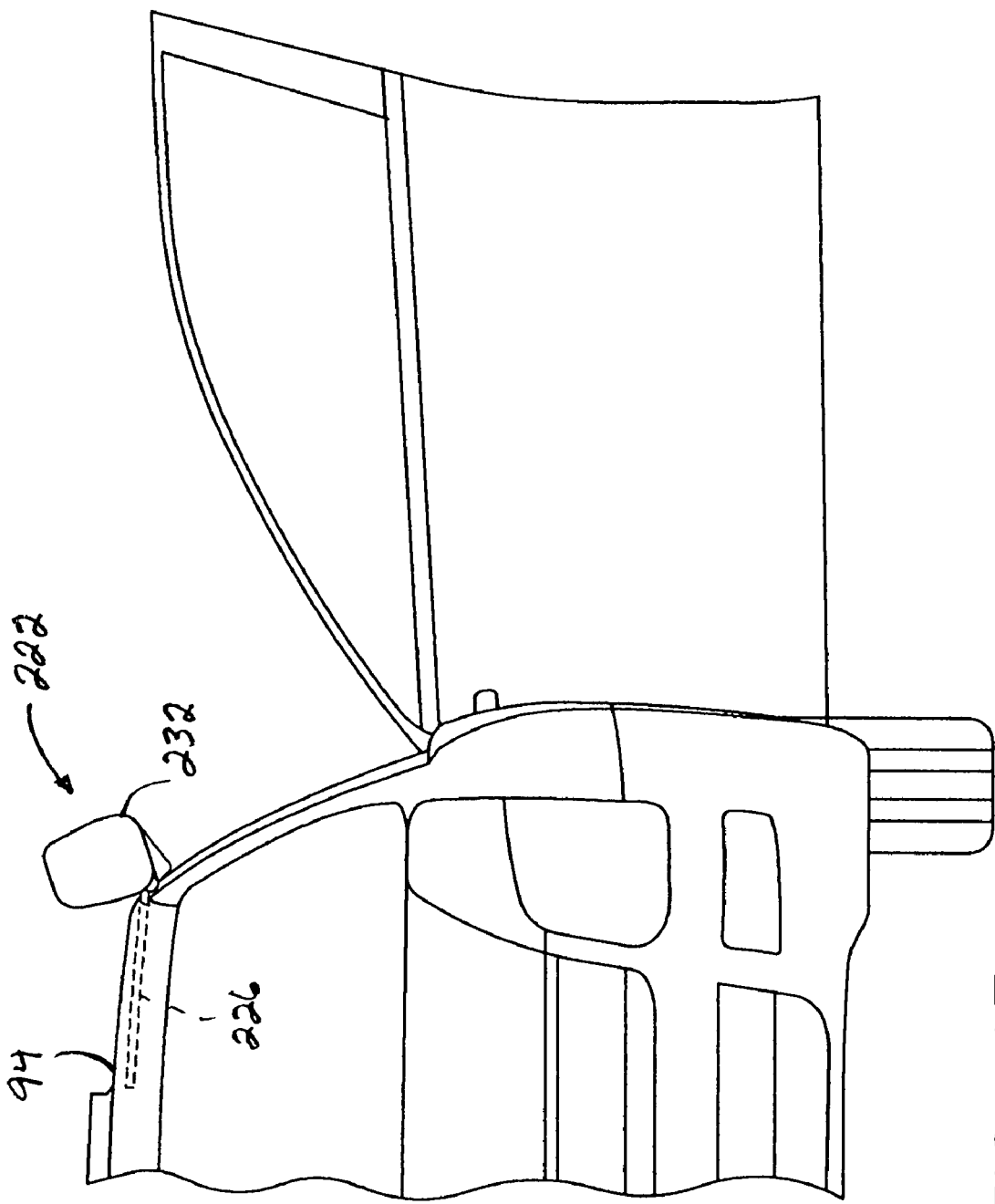
FIG. 17 is a partial front view of the automobile depicted in FIG. 16, where the side mirror assembly is in the retracted position to permit opening and closing of the door.
Figure 18:
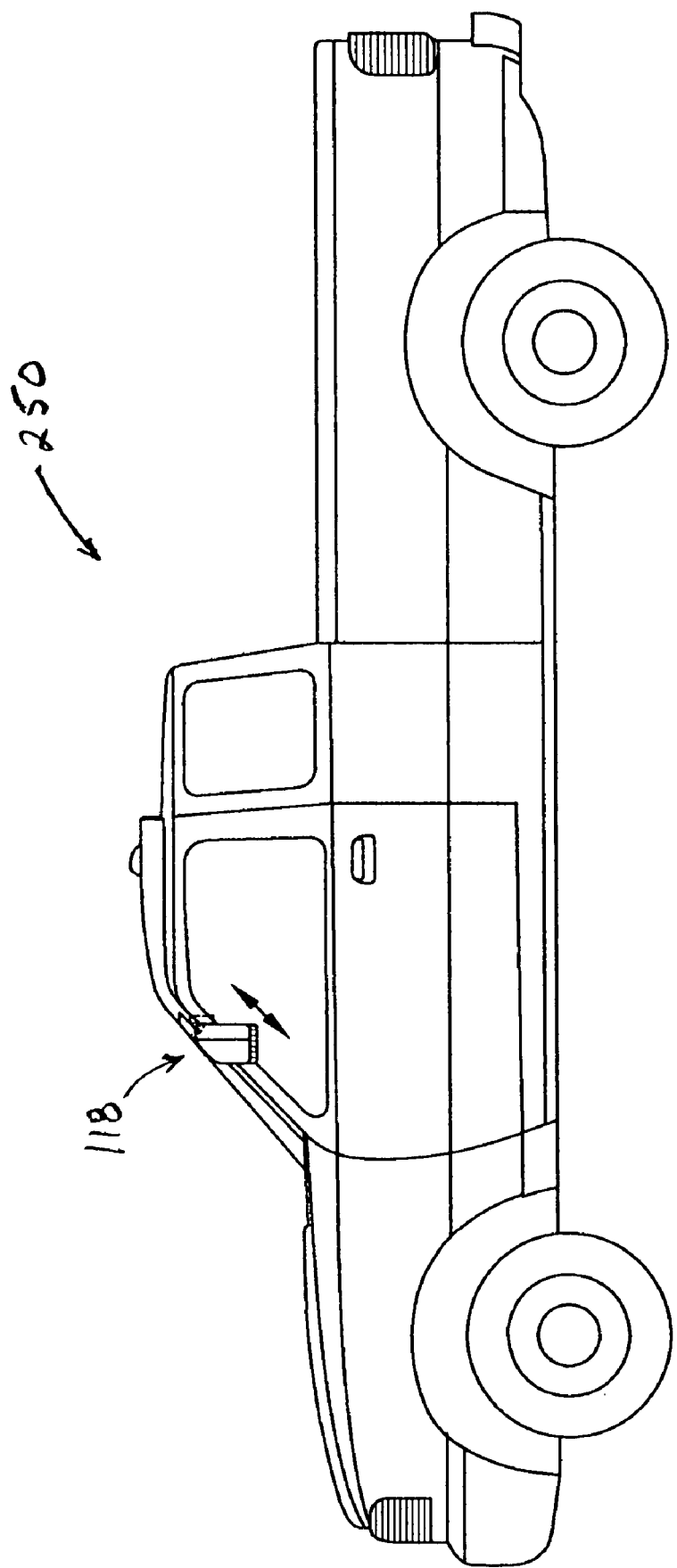
FIG. 18 is a side view of a truck including an adjustable side mirror assembly.
Figure 19:
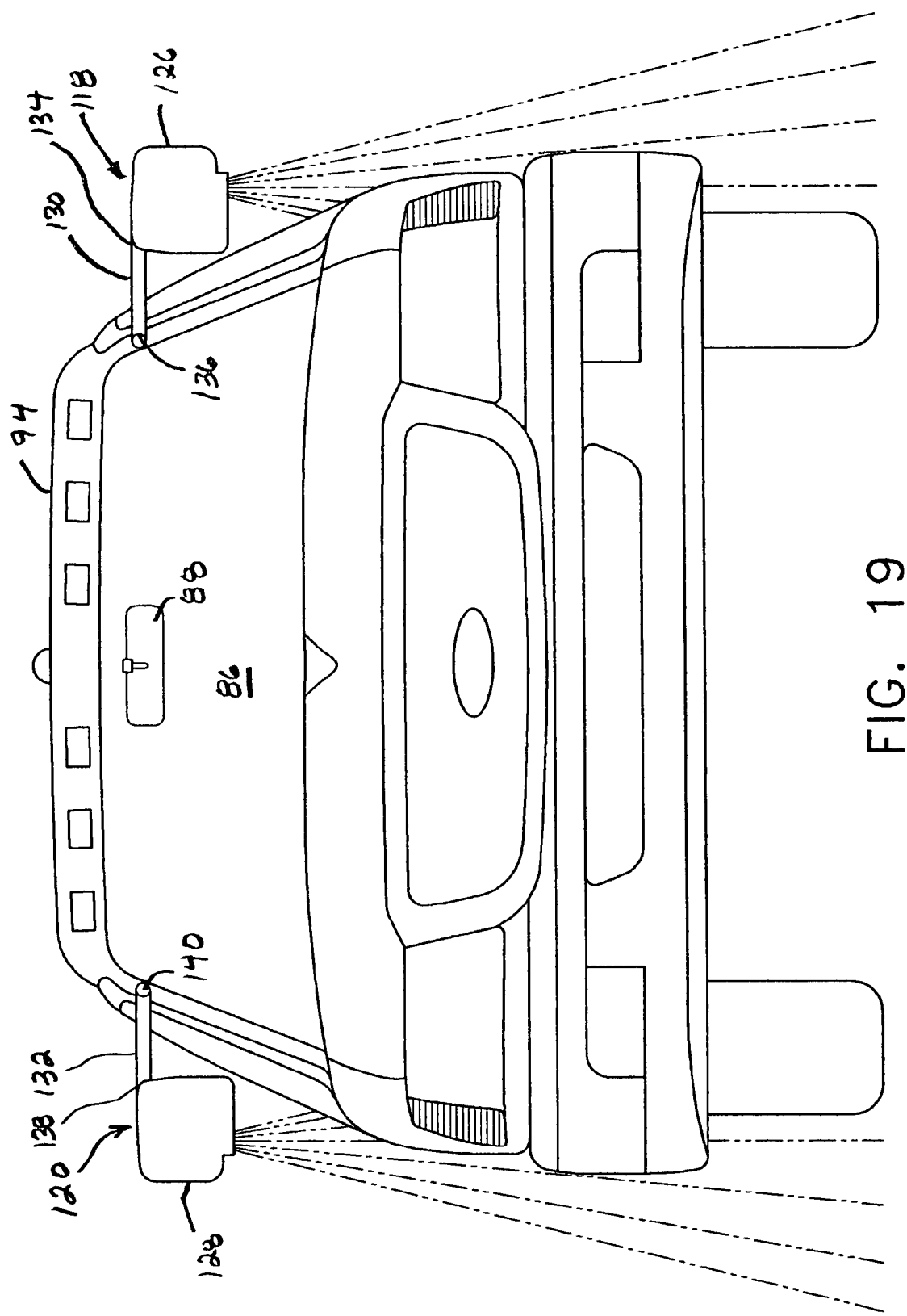
FIG. 19 is a front view of the truck depicted in FIG. 18 with the side mirror assemblies in the extended drive position.
Figure 20:
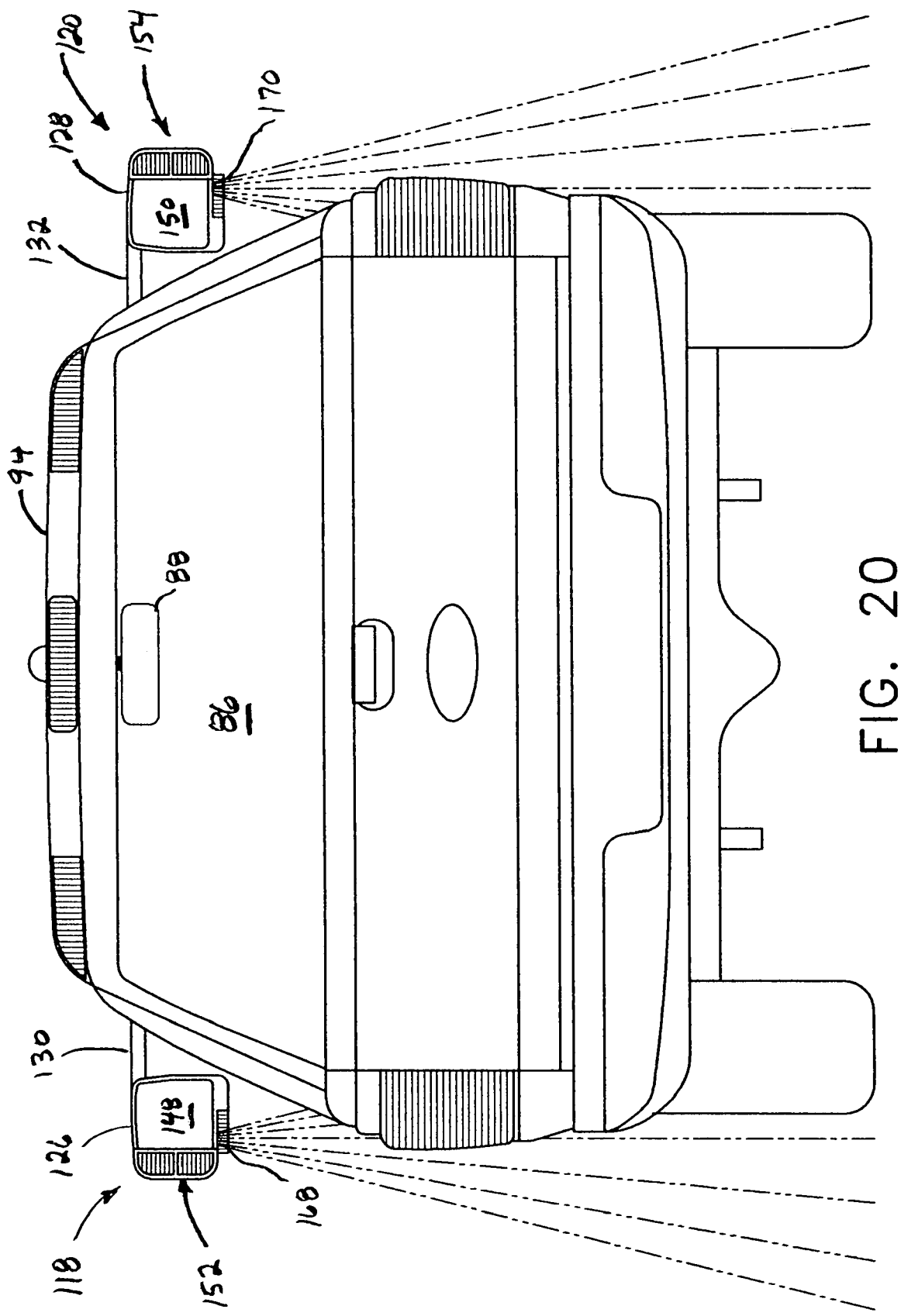
FIG. 20 is a rear view of the truck depicted in FIGS. 18 and 19, where the side mirror assemblies are in the extended drive position.
Figure 21:
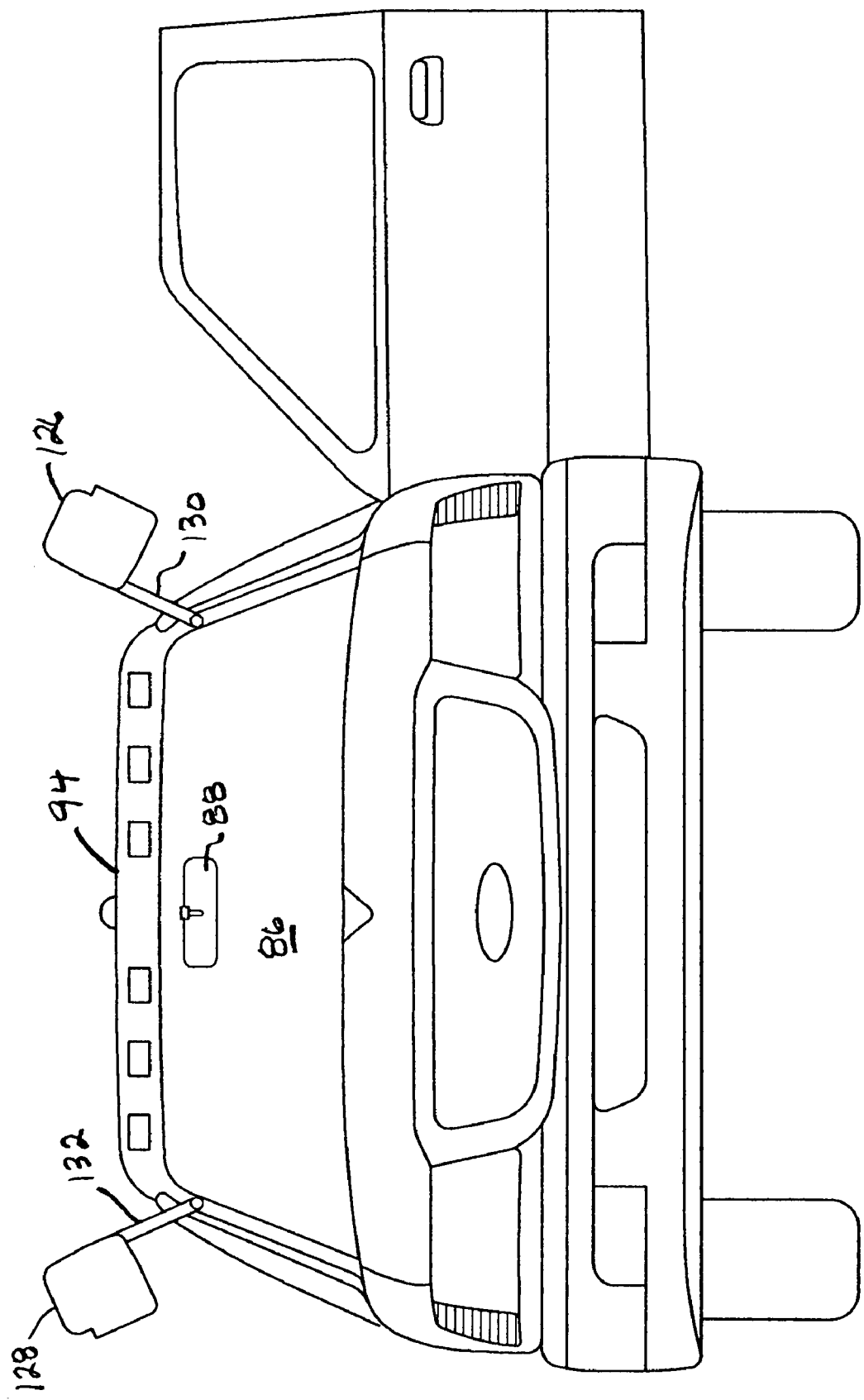
FIG. 21 is a front view of the truck depicted in FIGS. 18-20, where the side mirror assemblies are in the retracted position to allow opening and closing of the door.

In a second alternative embodiment depicted in FIGS. 16 and 17, first and second side mirror assemblies 222 and 224 are also movably attachable to first and second sides 178 and 180 of module 94 so as to be adjustable to a desired position. More specifically, first side mirror assembly 222 includes a rod member 226 which is retractably coupled within a cavity 228 in module 94 at a first end 230. A first side mirror housing 232 is attached to rod member 226 at a second end 234. Second side mirror assembly 224 includes a rod member 236 which is retractably coupled within a cavity 238 in module 94 at a first end 240. A second side mirror housing 242 is attached to rod member 236 at a second end 244. In this way, side mirror housings 232 and 242 are movable between an extended position and a retracted position.

Contrary to rod members 182 and 192, however, rod members 226 and 236 are preferably linear and attached to an upper portion of first and second side mirror housings 232 and 242. Accordingly, first and second side mirror housings 232 and 242 are positioned below first and second side members 66 and 72, respectively, when in the extended and retracted positions. In order to permit the doors of vehicle 10 to open and close without obstruction, it is preferred that first and second side mirror housings 232 and 242 be pivotably connected to rod members 226 and 236, respectively, at second ends 234 and 244 (see FIG. 17). Although not shown, it will be understood that the mirrors, lights and other options described herein are also applicable and associated with first and second side mirror housings 232 and 242.

Figure 22:
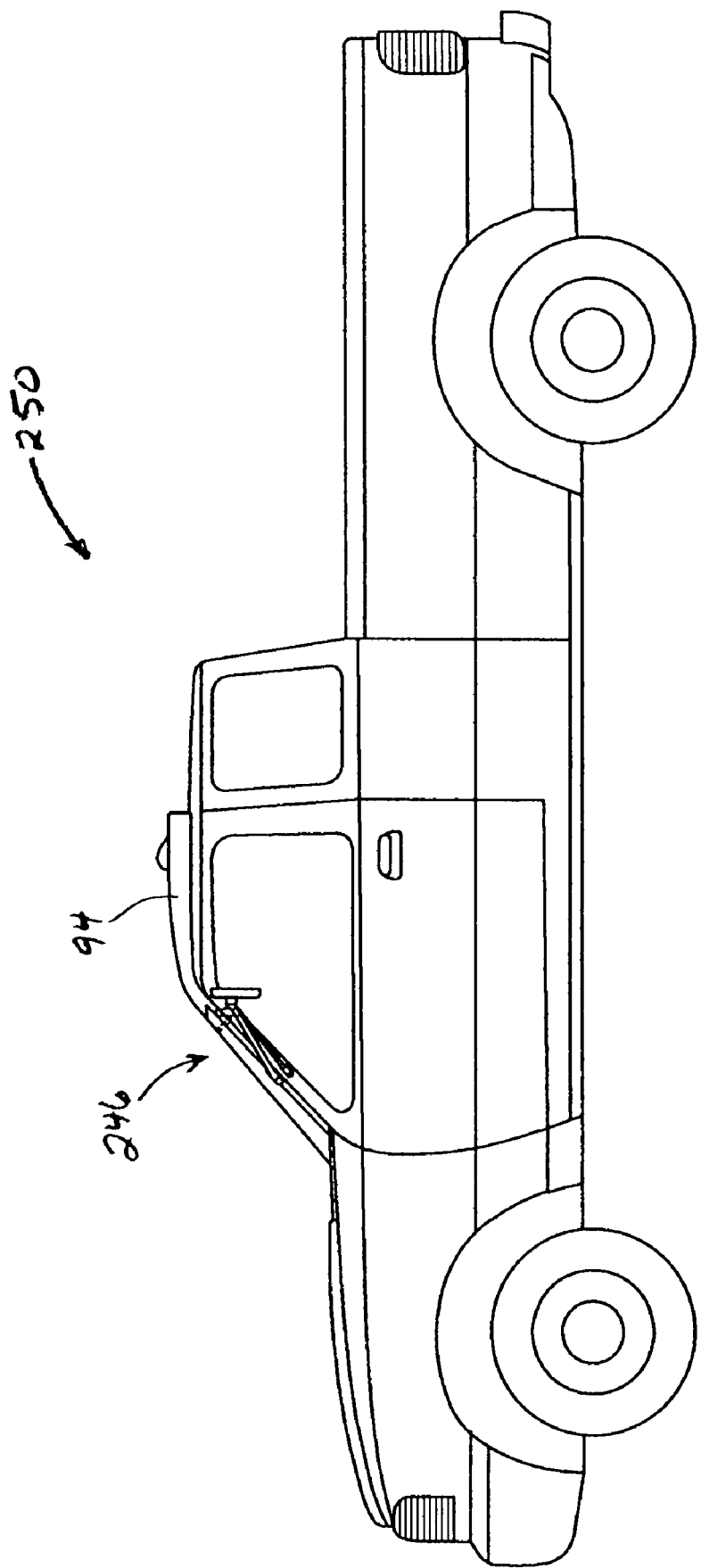
FIG. 22 is a side view of a truck including an adjustable side mirror assembly of a second embodiment.
Figure 23:
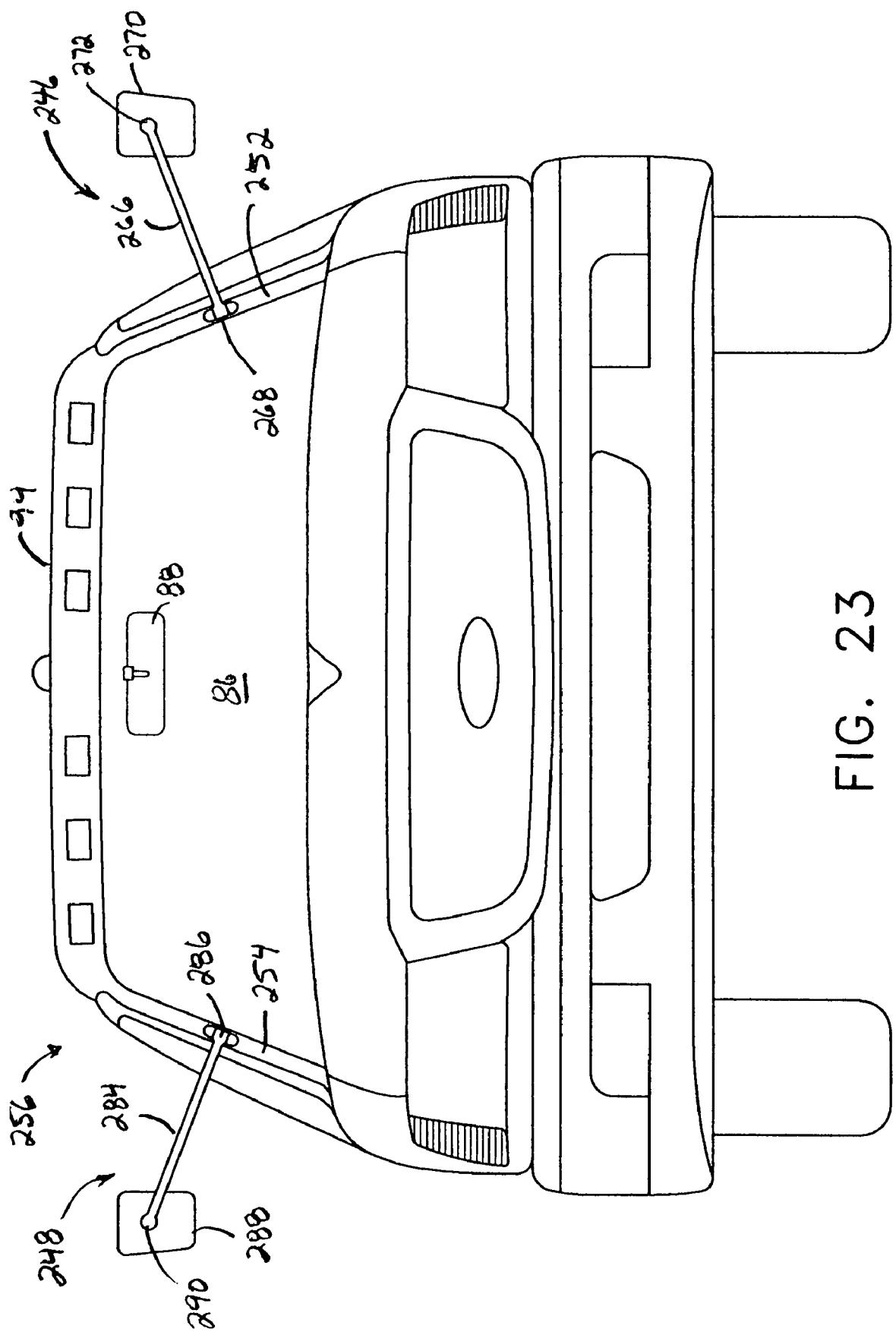
FIG. 23 is a front view of the truck depicted in FIG. 22, where the doors are in the closed position.
Figure 24:
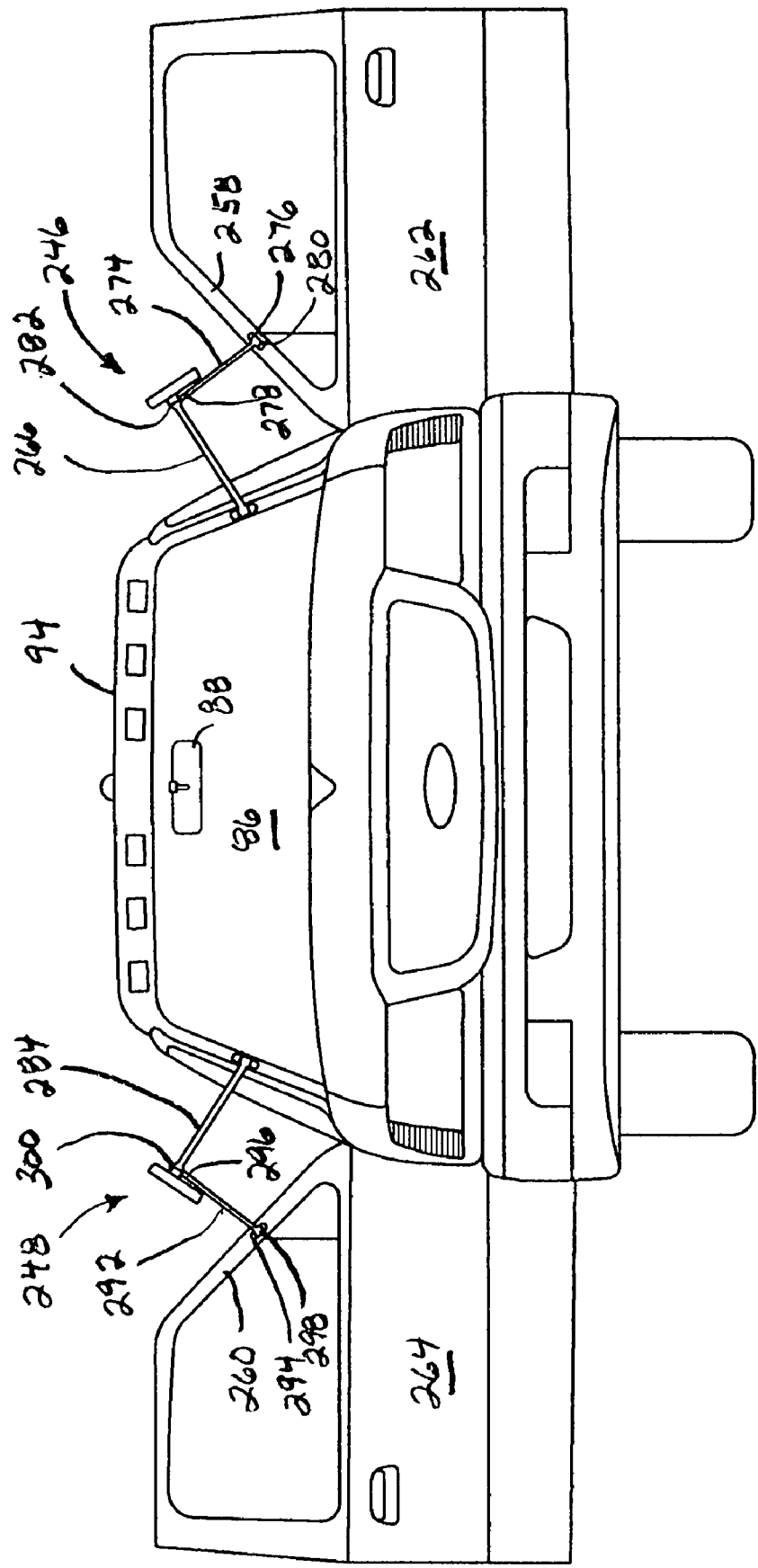
FIG. 24 is a front view of the truck depicted in FIGS. 22 and 23, where the doors are in the open position; and, FIG. 25 is a perspective view of the side mirror assembly depicted in FIGS. 18-21.

Yet another embodiment for mounting a side mirror in a relatively high position is depicted in FIGS. 22-24 with a truck 250. As seen therein, first and second side mirror assemblies 246 and 248 are mounted to a side member 252 and 254, respectively, of a windshield assembly 256 similar to that disclosed herein. In addition, side mirror assemblies 246 and 248 are mounted to an adjacent portion 258 and 260 of doors 262 and 264. This configuration enables side mirror assemblies 246 and 248 to swing and pivot as doors 262 and 264 are opened and closed.

More specifically, first side mirror assembly 246 includes a first rod member 266 that is pivotably connected to first side member 252 at a first end 268 and to a first side mirror housing 270 at a second end 272. A second rod member 274 is connected to door 262 at a first end 276 and to first rod member 266 at a second end 278. It is preferred that second rod member 274 is coupled at each end by means of universal joints 280 and 282. Likewise, second side mirror assembly 248 preferably includes a first rod member 284 that is pivotably connected to second side member 254 at a first end 286 and to a second side mirror housing 288 at a second end 290. A second rod member 292 is connected to door 264 at a first end 294 and to first rod member 286 at a second end 296. It is also preferred that second rod member 292 be coupled at each end by means of universal joints 298 and 300.

Having shown and described the preferred embodiment of the present invention, further adaptations of module 94, as well as side mirror assemblies 118 and 120, side mirror assemblies 174 and 176, side mirror assemblies 222 and 224, and side mirror assemblies 246 and 248, can be accomplished by appropriate modifications by one of ordinary skill in the art without departing from the scope of the invention. For example, first and second side mirror assemblies 174 and 176 and first and second side mirror assemblies 222 and 224 may be movably attachable to first and second sides of a roof for vehicle 10 instead of module 94. Moreover, it will be understood that the embodiments described herein may be utilized with all types of vehicles, including those not depicted herein, such as an automobile, truck, minivan, sport utility vehicle, van, bus, etc.

What is claimed is:

1. An assembly configured to be attachable to a front portion of a frame for a vehicle, wherein a longitudinal axis extends through said assembly, comprising:
    (a) a first cross member oriented substantially perpendicular to said longitudinal axis positioned at a forward end of said assembly;
    (b) a first side member attached to a first end of said first cross member at a first end thereof, said first side member extending rearward and upward therefrom;
    (c) a second side member attached to a second end of said first cross member at a first end thereof, said second side member extending rearward and upward therefrom;
    (d) a second cross member connected to a second end of said first side member at a first end thereof and to a second end of said second side member at a second end thereof, wherein an open area is defined by said first cross member, said first side member, said second side member, and said second cross member;
    (e) a first side mirror assembly movably attachable to said first side member; and,
    (f) a second side mirror assembly movably attachable to said second side member;
    wherein said first and second side mirror assemblies are adjustable to a desired position such that said first and second side mirror assemblies are adjustable to the desired position having a desired location along said respective side member such that each side member is an A pillar of the vehicle.

2. The assembly of claim 1, wherein said first and second side mirror assemblies are adjustable to the desired position having a desired height relative to said longitudinal axis.

3. The assembly of claim 1, each of said first and second side mirror assemblies further comprising:
    (a) a track mechanism provided along one of said first and second side members;
    (b) a side mirror housing; and,
    (c) a rod member connected to said side mirror housing at a first end and coupled to said track mechanism at a second end; wherein said side mirror housing is movable between a first position and a second position.

4. The assembly of claim 3, said rod member being connected to an upper portion of said side mirror housing so that said side mirror housing extends below said respective side member.

5. The assembly of claim 4, said rod member being pivotably coupled to said track mechanism so that said side mirror housing is movable above said respective side member.

6. The assembly of claim 3, wherein said first and second side mirror housings are able to be positioned in a substantially horizontal plane with a rear view mirror in said vehicle.

7. The assembly of claim 3, said side mirror housing further comprising a mirror positioned along a rear surface thereof.

8. The assembly of claim 7, said side mirror housing further comprising a lighting package positioned adjacent to and outwardly from said mirror.

9. The assembly of claim 8, said lighting package further comprising a first light indicative of a directional signal.

10. The assembly of claim 8, said lighting package further comprising a second light indicative of brake activation.

11. The assembly of claim 8, said lighting package further comprising a third light indicative of rearward movement.

12. The assembly of claim 8, said lighting package further comprising a fourth light focused downward.

13. The assembly of claim 3, said side mirror housing further comprising a speaker associated therewith.

14. The assembly of claim 3, wherein said side mirror housing is pivotable with respect to said rod member.

15. An assembly configured to be attachable to a front portion of a frame for a vehicle, wherein a longitudinal axis extends through said assembly, comprising:
    (a) a first cross member oriented substantially perpendicular to said longitudinal axis positioned at a forward end of said assembly;
    (b) a first side member attached to a first end of said first cross member at a first end thereof, said first side member extending rearward and upward therefrom;
    (c) a second side member attached to a second end of said first cross member at a first end thereof, said second side member extending rearward and upward therefrom;
    (d) a second cross member connected to a second end of said first side member at a first end thereof and to a second end of said second side member at a second end thereof, wherein an open area is defined by said first cross member, said first side member, said second side member, and said second cross member;

(e) a substantially planar member attached to and extending rearward from said second cross member;

(f) a module affixed to a top surface of said planar member;

(g) a first side mirror assembly movably attachable to a first side of said module; and, (h) a second side mirror assembly movably attachable to a second side of said module;

wherein said first and second side mirror assemblies are adjustable to a desired position such that said first and second side mirror assemblies are adjustable to the desired position having a desired location along said respective side member such that each side member is an A pillar of the vehicle.

16. An assembly configured to be attachable to a front portion of a frame for a vehicle, wherein a longitudinal axis extends through said assembly, comprising:

(a) a first cross member oriented substantially perpendicular to said longitudinal axis positioned at a forward end of said assembly;

(b) a first side member attached to a first end of said first cross member at a first end thereof, said first side member extending rearward and upward therefrom;

(c) a second side member attached to a second end of said first cross member at a first end thereof, said second side member extending rearward and upward therefrom;

(d) a second cross member connected to a second end of said first side member at a first end thereof and to a second end of said second side member at a second end thereof, wherein an open area is defined by said first cross member, said first side member, said second side member, and said second cross member;

(e) a substantially planar member attached to and extending rearward from said second cross member;

(f) a module affixed to a top surface of said planar member, said module including a light incorporated therein facing rearward that is indicative of brake actuation;

(g) a first side mirror assembly movably attachable to a first side of said module; and, (h) a second side mirror assembly movably attachable to a second side of said module;

wherein said first and second side mirror assemblies are adjustable to a desired position such that said first and second side mirror assemblies are adjustable to the desired position having a desired location along said respective side member such that each side member is an A pillar of the vehicle.

* * * * *